(12) United States Patent
Yamamoto et al.

(10) Patent No.: US 11,181,175 B2
(45) Date of Patent: Nov. 23, 2021

(54) LINK MECHANISM, CONTROL DEVICE AND CONTROL METHOD THEREOF

(71) Applicant: Honda Motor Co., Ltd., Tokyo (JP)

(72) Inventors: Taichi Yamamoto, Saitama (JP); Tomohiro Kawakami, Saitama (JP); Eisoku Kuroiwa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/874,650

(22) Filed: May 14, 2020

(65) Prior Publication Data
US 2020/0362951 A1   Nov. 19, 2020

(30) Foreign Application Priority Data

May 17, 2019  (JP) .............................. JP2019-093337
Jun. 11, 2019  (JP) .............................. JP2019-109024

(51) Int. Cl.
*F16H 37/12*   (2006.01)

(52) U.S. Cl.
CPC .................... *F16H 37/12* (2013.01)

(58) Field of Classification Search
CPC ... F16H 37/12; F16G 13/18; B25J 9/06; B25J 9/104; B25J 17/00; B25J 18/00
See application file for complete search history.

(56) References Cited

U.S. PATENT DOCUMENTS

| 2001/0018591 | A1* | 8/2001 | Brock | G16H 20/40 |
| | | | | 606/130 |
| 2005/0164837 | A1* | 7/2005 | Anderson | A63B 22/001 |
| | | | | 482/52 |
| 2017/0020615 | A1* | 1/2017 | Koenig | A61B 34/72 |

FOREIGN PATENT DOCUMENTS

| JP | H0819973 | | 1/1996 |
| JP | 2006231454 | | 9/2006 |
| WO | WO 89/08537 | * | 9/1989 |
| WO | WO 2015190599 A1 | * | 12/2015 |
| WO | WO 2017214259 A1 | * | 12/2017 |

OTHER PUBLICATIONS

Velocity, Wikipedia, Mar. 24, 2021 (Year: 2021).*
Velocity, meriam-webster.com., Mar. 24, 2021 (Year: 2021).*

* cited by examiner

*Primary Examiner* — Vinh Luong
(74) *Attorney, Agent, or Firm* — JCIPRNET

(57) ABSTRACT

A link mechanism includes a first link connected with a first joint, a first motor driving the first link to rotate, a second link connected with a second joint, a second motor driving the second link to rotate, and a power transmission mechanism. The power transmission mechanism is configured as capable of switching between a connected state with connection with which power of the first motor and the second motor can be transmitted between the first joint and the second joint and a disconnected state in which the connection is removed. In the case where the power transmission mechanism is in the connected state, the first joint and the second joint rotate so that an angular velocity of the first joint and an angular velocity of the second joint are proportional to each other.

13 Claims, 19 Drawing Sheets

LINK MECHANISM, CONTROL DEVICE AND CONTROL METHOD THEREOF

CROSS-REFERENCE TO RELATED APPLICATION

This application claims the priority benefit of Japan application serial no. 2019-093337, filed on May 17, 2019 and Japan application serial no. 2019-109024, filed on Jun. 11, 2019. The entirety of each of the above-mentioned patent applications is hereby incorporated by reference herein and made a part of this specification.

BACKGROUND

Technical Field

The invention relates to a link mechanism that drives a link by an actuator and a control device and a control method thereof.

Description of Related Art

Conventionally, as a link mechanism, a link mechanism described in Patent Document 1 and a control device of a link mechanism described in Patent Document 2 are known. The link mechanism is of a two joint link mechanism type, and includes a base, a first link, a second link, a first joint, and a second joint. In the link mechanism, the base and the first link are connected via the first joint, and the first link and the second link are connected via the second joint.

In addition, the first joint is of an active joint type, and includes a first hydraulic cylinder as a first actuator. The angle of the first joint is changed by the first hydraulic cylinder. Moreover, the second joint is of an active joint type, and includes a second hydraulic cylinder as a second actuator. The angle of the second joint is changed by the second hydraulic cylinder.

Furthermore, in the control device of the link mechanism, the angle of the first joint is controlled by controlling the first actuator, and the angle of the second joint is controlled by controlling the second actuator.

PRIOR ART DOCUMENTS

Patent Documents

[Patent Document 1] Japanese Laid-open No. H08-19973
[Patent Document 2] Japanese Laid-open No. 2006-231454

In the case where the link mechanism is applied to an industrial robot, etc., a heavy load may be handled by the tip end part of the second link, and in such case, in order to hold the heavy object without reducing the hand velocity, a motor with a high output, which serves as an actuator, becomes necessary. As a result, the size and the weight of the actuator are increased, the consumed energy is increased, and the manufacturing cost and the running cost are increased. In order to solve the issue, it is considered to configure that the power of the actuator be transmitted between the joints. In the case of such configuration, even though the energy consumed by the actuator can be reduced, the necessity for suitable control over the link velocity responsive to the power transmission state emerges.

SUMMARY

An aspect of the invention provides a link mechanism. The link mechanism includes: a first joint; a first link, connected with the first joint; a first actuator, driving the first link; a second joint; a second link, connected with the second joint; a second actuator, driving the second link; and a power transmission mechanism, configured as capable of switching between a connected state with connection between the first joint and the second joint, so that at least one state of a first state capable of transmitting power resulting from the first actuator from the first joint to the second joint and a second state capable of transmitting power resulting from the second actuator from the second joint to the first joint is established, and a disconnected state in which the connection is removed. In a case where the power transmission mechanism is in the connected state, the first joint and the second joint operate so that a velocity of the first joint and a velocity of the second joint are proportional to each other.

DESCRIPTION OF THE EMBODIMENTS

The invention provides a link mechanism capable of reducing costs while being capable of reducing the size and the weight of the actuator and reducing the consumed energy.

The invention also provides a control device, etc., of the link mechanism capable of suitably controlling the link velocity responsive to the power transmission state between the joints.

Figure 1:
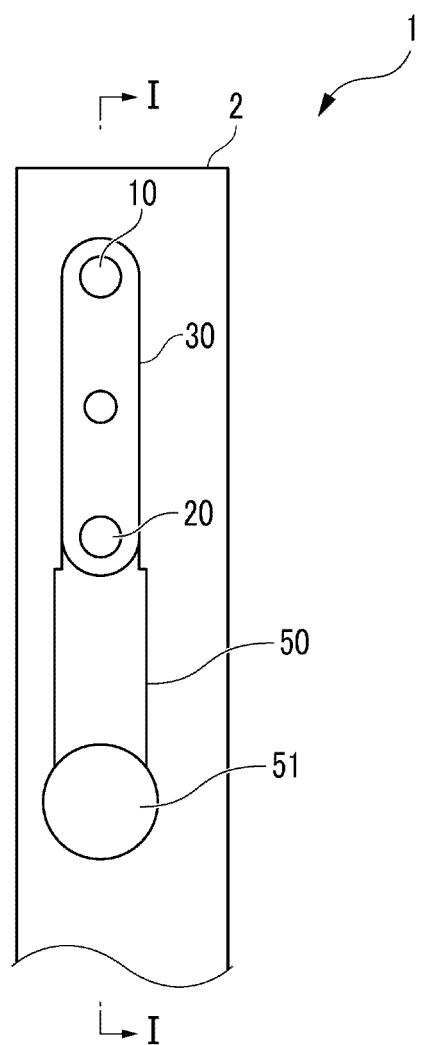
FIG. 1 is a side view illustrating a configuration of a link mechanism according to a first embodiment of the invention.
Figure 2:
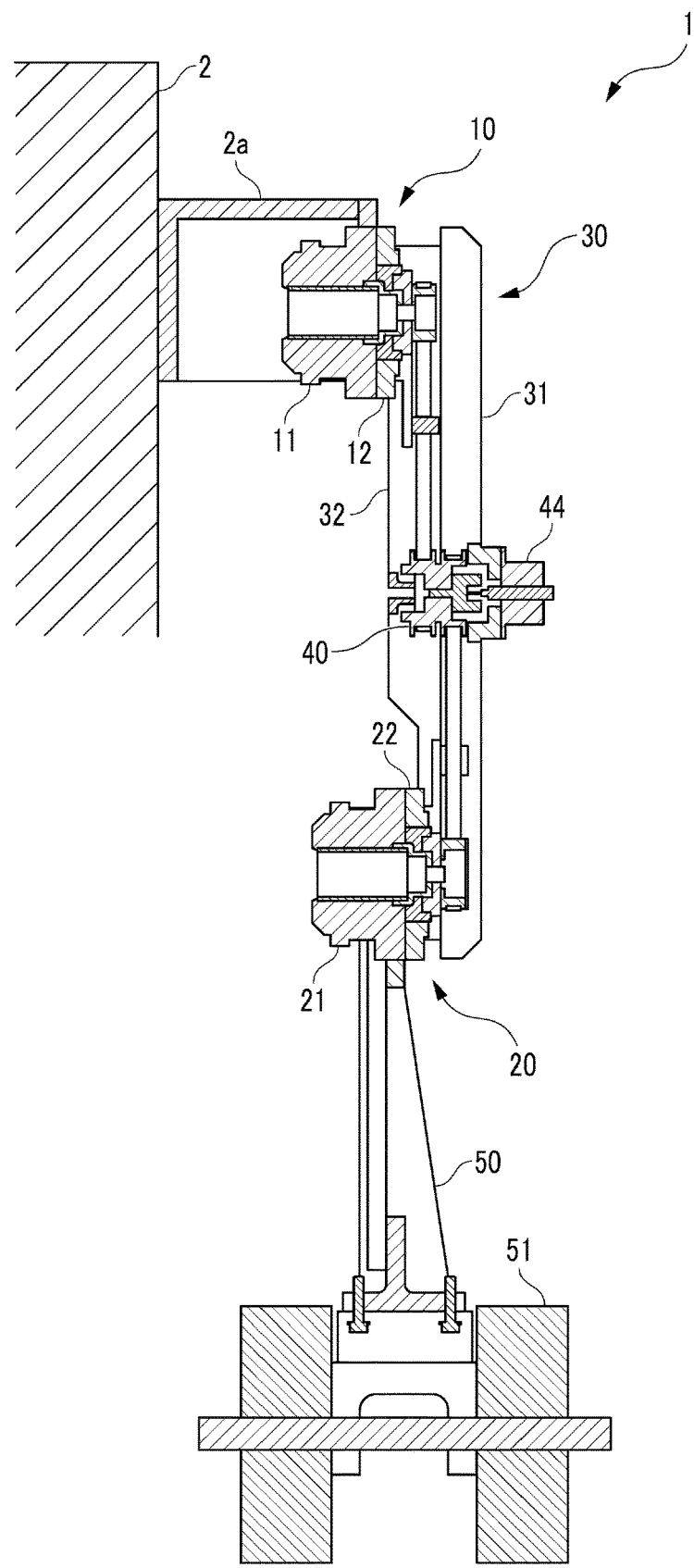
FIG. 2 is a cross-sectional view along I-I of FIG. 1.
Figure 3:
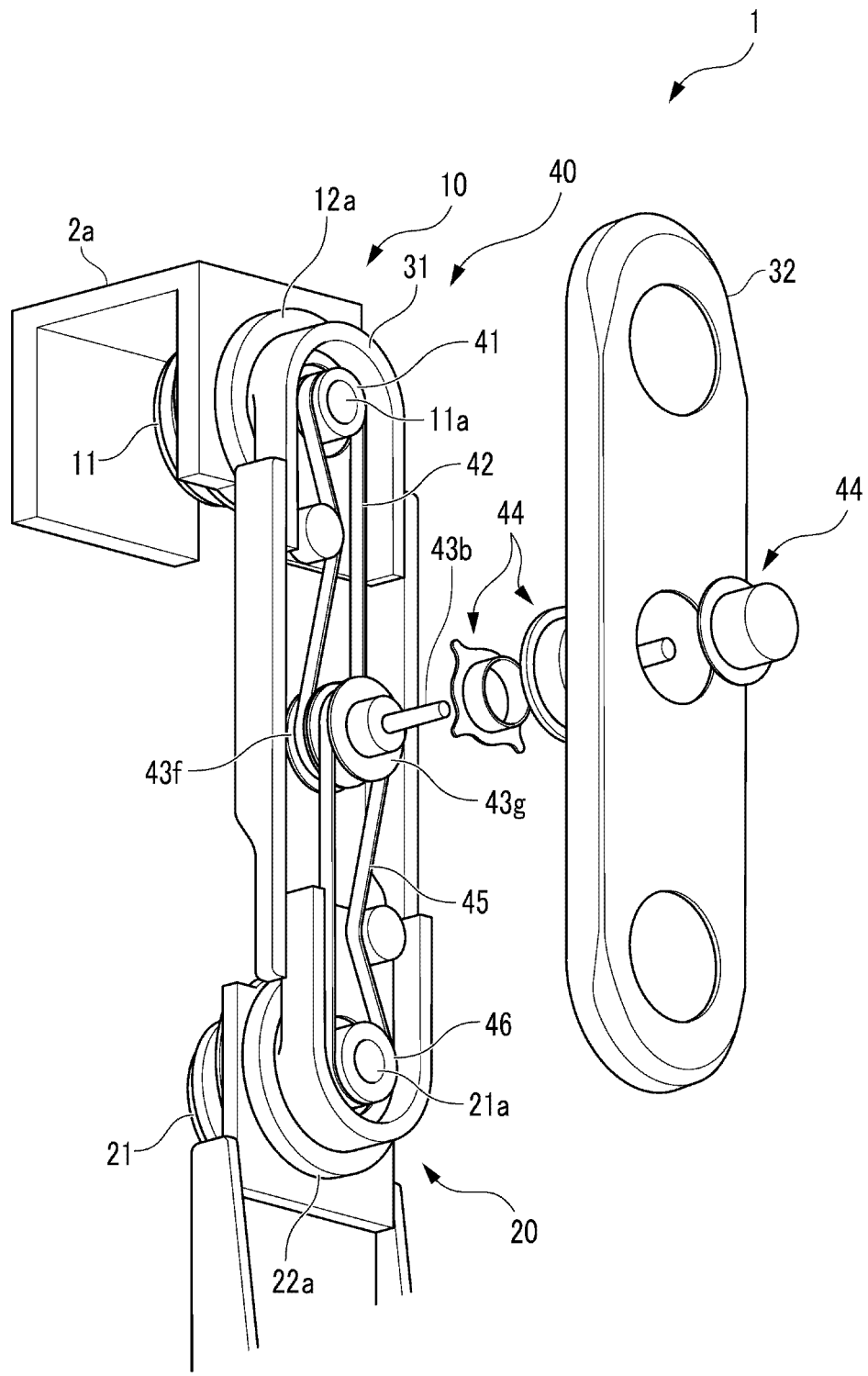
FIG. 3 is an exploded oblique view of a power transmission mechanism.

In the following, a link mechanism according to the first embodiment of the invention will be described with reference to the drawings. As shown in FIGS. 1 to 3, a link mechanism 1 of the present embodiment is connected with an attaching member 2a of an upper portion of a base 2. The base 2 extends in the up-down direction for a predetermined length.

The link mechanism 1 is a two-joint link mechanism of a serial link type, and includes a first joint 10, a second joint 20, a first link 30, a power transmission mechanism 40, and a second link 50, etc.

The first link 30 extends for a predetermined length between the first joint 10 and the second joint 20, and has a base part 31 and a cover part 32 (as shown in FIG. 2). One end part of the base part 31 is provided a first decelerator 12 of the first joint 10, which will be described afterwards, and the other end part is provided with a second decelerator 22 of the second joint 20, which will be described afterwards.

In addition, the power transmission mechanism 40 is provided between the end part and the other end part of the base part 31 of the first link 30. In addition, the cover part 32 is provided to cover all of the first decelerator 12, the second decelerator 22, and the power transmission mechanism 40.

In addition, the second link 50 extends for a predetermined length from the second joint 20, and a weight 51 is attached to the tip end part of the second link 50.

Meanwhile, the first joint 10 is of an active joint type and includes a first motor 11 and the first decelerator 12, etc. The first motor 11 (the first actuator) is configured by an AC motor or a brushless DC motor, and a casing and a stator thereof are fixed to the attaching member 2a of the base 2. The first motor 11 is electrically connected with a controller 70 to be described afterwards (FIG. 15), and at the time when a driving signal from the controller 70 is input, the first motor 11 rotates in accordance with the driving signal.

A first pulley 41 of the power transmission mechanism 40 is provided at the tip end part of a rotating shaft 11a of the first motor 11. The first pulley 41 is fixed to the rotating shaft 11a of the first motor 11 so as to concentrically and integrally rotate with the rotating shaft 11a of the first motor 11. In the present embodiment, the first motor 11 is equivalent to the first actuator, and the rotating shaft 11a is equivalent to the first element.

In addition, the first decelerator 12 is of a wave gear mechanism type, and is configured by a wave generator, a flexspline, and a circular spline 12a. In the case of the first decelerator 12, the wave generator is fixed to the rotating shaft 11a of the first motor 11 so as to concentrically and integrally rotate with the rotating shaft 11a of the first motor 11.

In addition, the end part of the flexspline on the side of the base 2 is fixed to the attaching member 2a, and the circular spline 12a is fixed to a portion of the base part 31 of the first link 30 on the side of the first decelerator 12.

Given the above configuration, with the rotation of the rotating shaft 11a of the first motor 11, the first link 30 rotates around the rotating shaft of the first motor 11, i.e., the rotating shaft of the first joint 10, while being decelerated at a predetermined deceleration ratio (e.g., a value of 1/100). At this time, the first link 30 rotates in the same direction as the rotating shaft 11a of the first motor 11. Therefore, in the present embodiment, the rotating shaft 11a is equivalent to the rotating shaft of the first joint 10.

Meanwhile, the second joint 20, like the first joint 10, is of an active joint type and includes a second motor 21 and the second decelerator 22, etc. The second motor 21 (the second actuator), like the first motor 11, is configured by an AC motor or a brushless DC motor, and a casing and a stator thereof are fixed to the end part of the second link 50 on the side of the second decelerator 22.

The second motor 21, like the first motor 11, is electrically connected with the controller 70, and at the time when a driving signal from the controller 70 is input, the second motor 21 rotates in accordance with the driving signal. A second pulley 46 of the power transmission mechanism 40 is provided at the tip end part of a rotating shaft 21a of the second motor 21.

The second pulley 46 is fixed to the rotating shaft 21a of the second motor 21 so as to concentrically and integrally rotate with the rotating shaft 21a of the second motor 21. In addition, the rotating shaft 21a of the second motor 21 is connected with the first link 30 and the second link 50 via the second decelerator 22. In the present embodiment, the second motor 21 is equivalent to the second actuator, and the rotating shaft 21a is equivalent to the second element.

The second decelerator 22 is of a wave gear mechanism type with the same deceleration ratio as the first decelerator 12, and is configured by a wave generator, a flexspline, and a circular spline 22a. In the case of the first decelerator 22, the wave generator is fixed to the rotating shaft 21a of the second motor 21 so as to concentrically and integrally rotate with the rotating shaft 21a of the second motor 21.

In addition, the end part of the flexspline on the side of the second link 50 is fixed to the second link 50, and the circular spline 22a is fixed to the end part of the first link 30 on the side of the second decelerator 22.

Given the above configuration, with the rotation of the rotating shaft 21a of the second motor 21, the second link 50 rotates around the rotating shaft of the second motor 21, i.e., the rotating shaft of the second joint 20, while being decelerated at the predetermined deceleration ratio. At this time, the second link 50 rotates in the opposite direction with respect to the rotating shaft 21a of the second motor 21. Therefore, in the present embodiment, the rotating shaft 21a is equivalent to the rotating shaft of the second joint 20.

In addition, the power transmission mechanism 40 includes the first pulley 40, a first belt 42, a planetary gear mechanism 43, an electromagnetic brake 44, a second belt 45, and the second pulley 46.

Figure 5:
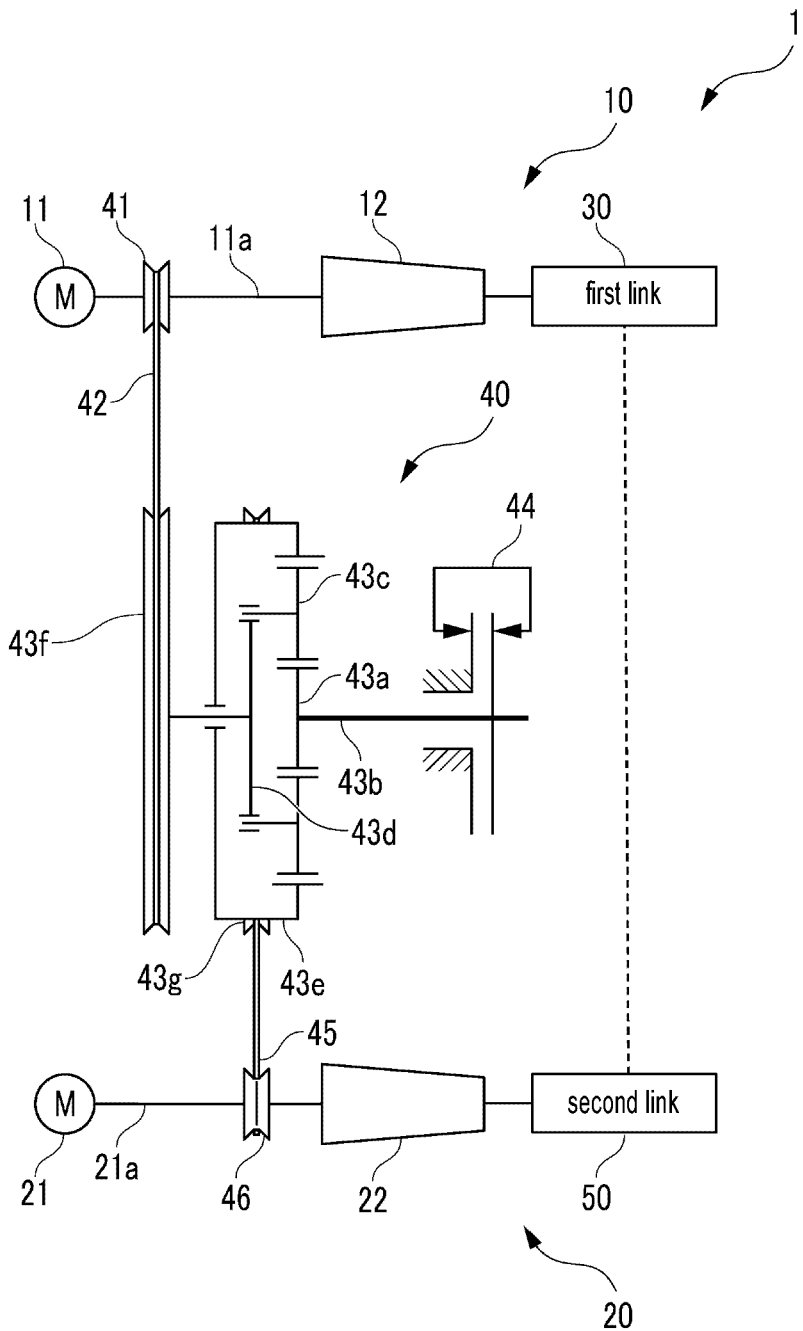
FIG. 5 is a skeleton diagram of the link mechanism.

The planetary gear mechanism 43 is of the single planetary type and includes a sun gear 43a, a planetary gear 43c, a planetary carrier 43d and a ring gear 43e (as shown in FIG. 5). In the planetary gear mechanism 43, a carrier side pulley 43f is fixed to the planetary carrier 43d so as to concentrically and integrally rotate with the planetary carrier 43d.

The first belt 42 is wound between the carrier side pulley 43f and the first pulley 41. With the above configuration, torque is transmitted between the first motor 11 and the planetary carrier 43d via the first pulley 41, the first belt 42, and the carrier side pulley 43f.

In addition, in the planetary gear mechanism 43, a ring side pulley 43f is fixed to the ring gear 43e so as to concentrically and integrally rotate with the ring gear 43e. The second belt 45 is wound between the ring side pulley 43g and the second pulley 46. With the above configuration, torque is transmitted between the ring gear 43e and the second motor 21 via the second pulley 46, the second belt 45, and the ring side pulley 43g.

Meanwhile, the electromagnetic brake 44 (the rotation stop mechanism) is one for switching the sun gear 43a between a rotation stopped state and a rotatable state, and is provided on the side of an end part of the rotating shaft 43b integral with the sun gear 43a. The electromagnetic brake 44 is electrically connected with the controller 70 not shown herein, in an ON operation state at the time when the driving signal from the controller 70 is input, and otherwise in an OFF operation state.

In the planetary gear mechanism 43, at the time when the electromagnetic brake 44 is in the ON operation state, the sun gear 43a is maintained in the rotation stopped state, and at the time when the electromagnetic brake 44 is in the OFF operation state, the sun gear 43a is changed to the rotatable state. In such case, as the configuration for switching the sun gear 43a between the rotatable state and the rotation stopped state, an electric actuator or a hydraulically driven actuator may also be used in place of the electromagnetic brake 44.

With the above configuration, in the power transmission mechanism 40, at the time when the electromagnetic brake 44 is in the ON operation state, torque can be transmitted between the planetary carrier 43d and the ring gear 43e, and the planetary carrier 43d and the ring gear 43e rotate in the same direction during the torque transmission. As a result, torque can be transmitted between the rotating shaft 11a of the first motor 11 and the rotating shaft 21a of the second motor 21, i.e., between the first joint 10 and the second joint 20. Meanwhile, at the time when the electromagnetic brake 44 is in the OFF operation state, torque is substantially not transmitted between the planetary carrier 43d and the ring gear 43e.

Accordingly, in the power transmission mechanism 40 of the present embodiment, at the time when the electromagnetic brake 44 is in the ON operation state, the first joint 10 and the second joint 20 are connected, and torque can be transmitted between the first joint 10 and the second joint 20, while at the time when the electromagnetic brake 44 is in the OFF operation state, the first joint 10 and the second joint 20 are in a state of being substantially cut off from each other. In the following descriptions, the time when the electromagnetic brake 44 is in the ON operation state is referred to as "the power transmission mechanism 40 is in the connected state", and the time when the electromagnetic brake 44 is in the OFF operation state is referred to as "the power transmission mechanism 40 is in the disconnected state".

In this case, at the time when the power transmission mechanism 40 is in the connected state, the rotating shaft 11a of the first motor 11 and the rotating shaft 21a of the second motor 21 are connected via the four pulleys 41, 43f, 43g, 46, the two belts 42 and 45, and the planetary gear mechanism 43.

Therefore, with a gear ratio N1 of one set of the pulleys 41 and 43f, a gear ratio N2 of one set of the pulleys 43g and 46, and a gear ratio r of the planetary gear mechanism 43, by setting a proportional coefficient (proportional parameter) as p, $\omega 1 = p \cdot \omega 2$ is established between an angular velocity $\omega 1$ of the first joint 10 (the motor 11) and an angular velocity $\omega 2$ of the second joint 20 (the motor 21). That is, the two angular velocities $\omega 1$ and $\omega 2$ are in a relationship of restricting each other. In the case of the link mechanism 1 of the present embodiment, with the establishment of $\omega 1 = p \cdot \omega 2$, the rotation velocity of the first joint 10 and the rotation velocity of the second joint 20 are proportional to each other. In the present embodiment, the angular velocity $\omega 1$ is equivalent to the velocity and the angular velocity of the first joint, and the angular velocity $\omega 2$ is equivalent to the velocity and the angular velocity of the second joint.

The angular velocity $\omega 1$ of the first joint 10 (i.e., the angular velocity $\omega 1$ of the first motor 11 is referred to as "first angular velocity $\omega 1$" in the following) is equivalent to the angular velocity between the attaching member 2a, i.e., the base 2, and the first link 30, and the angular velocity $\omega 2$ of the second joint 20 (i.e., the angular velocity $\omega 2$ of the second motor 21 is referred to as "second angular velocity $\omega 2$" in the following) is equivalent to the angular velocity between the first link 30 and the second link 50.

In addition, with the setting of the gear ratios N1 and N2 of the two sets of pulleys and the gear ratio r of the planetary gear mechanism 43, the proportional coefficient p can be set as various values as real numbers other than the value 0 (referring to Equation (B29) to be described afterwards). In addition, in the sun gear 43a, the planetary carrier 43d, and the ring gear 43e of the planetary gear mechanism 43, by choosing two rotation elements to which the pulleys 43f and 43g are attached and the remaining rotation element of the planetary gear mechanism 43 stopped by the electromagnetic brake 44, the proportional coefficient p can be set as a positive value or a negative value.

In the case of the present embodiment, with the above configuration, since the rotating direction of the first joint 10 is opposite to the rotating direction of the second joint 20, the proportional coefficient p becomes a negative value. More specifically, p=−1 is set. That is, between the first angular velocity $\omega 1$ and the second angular velocity $\omega 2$, it is configured that $\omega 1 = -\omega 2$.

Figure 4:
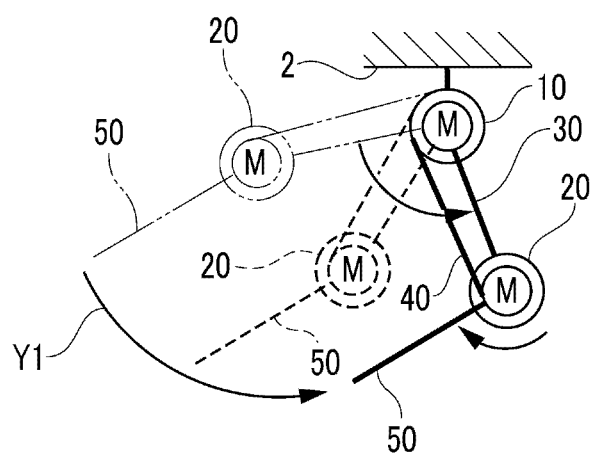
FIG. 4 is a schematic view illustrating an operation example of a link mechanism at the time when the power transmission mechanism is in a connected state.

With the above configuration, in the link mechanism 1 of the present embodiment, in the case where the power transmission mechanism 40 is in the connected state, at the time when the first motor 11 and the second motor 22 rotate, the first link 30 and the second link 50 operate, for example, as shown in FIG. 4.

That is, in the case where the first link 30 and the second link 50 are at the locations indicated by the two-dot chain lines shown in the figure, with the first motor 11 rotating in the counter-clockwise direction in the figure, the first link 30 rotates in the counter-clockwise direction about the rotating shaft of the first motor 11. Accordingly, the first link 30 rotates in the counter-clockwise direction from the location indicated by the two-dot chain line of the figure to the location indicated by the solid line via the location indicated by the broken line.

At the same time, with the second motor 21 rotating in the clockwise direction in the figure, the second link 50 rotates in the clockwise direction about the rotating shaft of the second motor 21. Accordingly, the second link 50 moves from the location indicated by the two-dot chain line of the figure to the location indicated by the solid line via the location indicated by the broken line. That is, apparently, the second link 50 does not change its posture, but only moves substantially in parallel, and the tip end part thereof moves along a curved trajectory indicated by an arrow sign Y1 in the figure.

In addition, the above configuration of the first joint 10, the power transmission mechanism 40, and the second joint 20 can be represented by the skeleton diagram shown in FIG. 5. As shown in the same figure, in the case where the power transmission mechanism 40 is in the disconnected state, in the first joint 10, the power of the first motor 11 is input to the first decelerator 12 via the rotating shaft 11a, and is input to the first link 30 after being decelerated by the first decelerator 12. In addition, the power of the first motor 21 is input to the second decelerator 22 via the rotating shaft 21a, and is input to the second link 50 after being decelerated by the second decelerator 22.

In the case where the power transmission mechanism 40 is in the connected state, the power between the rotating shaft 11a of the first motor 11 and the rotating shaft 21a of the second motor 21 can be transmitted in both directions, and, as described above, $\omega 1 = -\omega 2$ is established between the first joint 10 and the second joint 20. Accordingly, in the case of the present embodiment, at the time when the power transmission mechanism 40 is in the connected state, it is configured that the power can be transmitted between the rotating shaft 11a of the first motor 11 and the rotating shaft 21a of the second motor 21, i.e., between the input side of the first decelerator 12 and the input side of the second decelerator 22.

The reasons are as follows.

For example, differing from the present embodiment, in the case where the power transmission mechanism 40 is configured, so that at the time when the power transmission mechanism 40 is in the connected state, power can be transmitted between the output side of the first decelerator 12 and the output side of the second decelerator 22, and the torque capacity in the power transmission mechanism 40 is increased. Such an increase in the torque capacity in the power transmission mechanism 40 results in an increase in size and weight of the power transmission mechanism 40.

With respect to this, in the case where the power transmission mechanism 40 is configured, so that at the time when the power transmission mechanism 40 is in the connected state as in the present embodiment, the power can be transmitted between the input side of the first decelerator 12 and the input side of the second decelerator 22, and, opposite to the above, the torque capacity in the power transmission mechanism 40 can be reduced. Therefore, in the case of the present embodiment, in order to reduce the torque capacity in the power transmission mechanism 40 and attain a smaller and lighter power transmission mechanism 40, the above configuration is adopted.

In addition, in the case where the power transmission mechanism 40 is in the connected state, the torque resulting from the first motor 11 and the second motor 22 is transmitted between the first joint 10 and the second joint 20. Therefore, the link mechanism 1 can be driven by the torque generated by the first motor 11 and the second motor 21 and the torque transmitted via the power transmission mechanism 40. Accordingly, compared with the case of the disconnected state, the power consumed by the first motor 11 and the second motor 21 can be reduced in the case where the power transmission mechanism 40 is in the connected state.

Figure 6:
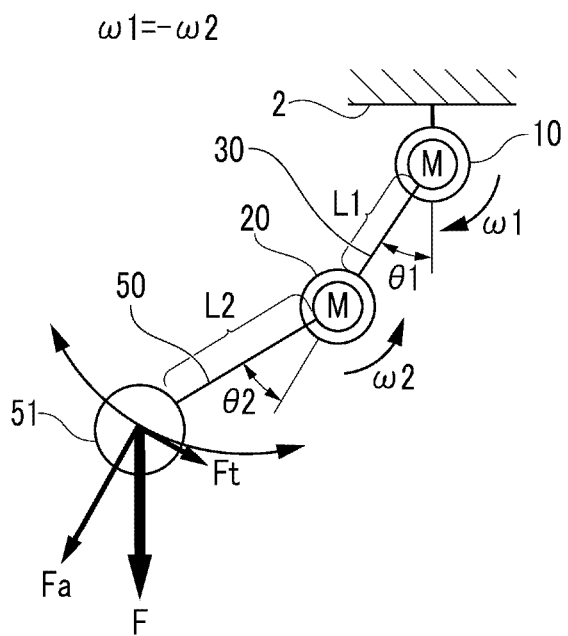
FIG. 6 is a schematic view for describing the function of the link mechanism.

Then, the function and the effect of the power transmission mechanism 40 in the link mechanism 1 configured as described above are described with reference to FIG. 6. In FIG. 6, for the ease of understanding, the illustration of the power transmission mechanism 40 is omitted. Firstly, the weight 51 is regarded as an external force F, and the external force F is assumed to act on the tip end part of the second link 50.

In the case where the external force F is decomposed into a component Fa perpendicular to the trajectory of the tip end part of the second link 50 and a component Ft in the tangential direction, the two components Fa and Ft are defined as Equations (B1) and B2) as follows. In this case, the component Fa perpendicular to the trajectory of the tip end part of the second link 50 is parallel to the first link 30.

$$Fa = F \cdot \cos \theta 1 \quad (B1)$$

$$Ft = F \cdot \sin \theta 1 \quad (B2)$$

θ1 in Equation (B1) above is the angle of the first joint 10.

Then, it is assumed that, under the condition that the power transmission mechanism 40 is in the disconnected state, the external force F is supported by the first motor 11 and the second motor 21. In this case, the torques necessary for supporting the external force F by the first joint 10 and the second joint 20 are respectively set as a first torque τ1 and a second torque τ2, and the torques τ1 and τ2 are values shown in Equations (B3) and (B4) as follows.

$$\tau 1 = F \cdot \{L1 \cdot \sin \theta 1 + L2 \cdot \sin(\theta 1 + \theta 2)\} \quad (B3)$$

$$\tau 2 = F \cdot L2 \cdot \sin(\theta 1 + \theta 2) \quad (B4)$$

In Equation (B3) above, L1 is the length of the first link 30, and L2 is the length of the second link 50. In addition, θ2 is the angle of the second joint 20.

Therefore, under the condition that the power transmission mechanism 40 is in the disconnected state, in the case where the external force F is supported by the first motor 11 and the second motor 21, the torques τ1 and τ2 shown in Equations (B3) and (B4) above are respectively necessary as torques τm1 and τm2 generated by the first motor 11 and the second motor 21. In the following descriptions, the torque τm1 generated by the first motor 11 is referred to as "first motor torque τm1", and the torque τm2 generated by the second motor 21 is referred to as "second motor torque τm2".

Then, it is assumed that, under the condition that the power transmission mechanism 40 is in the connected state, the external force F is supported by the first motor 11 and the second motor 21. As described above, in the case where the power transmission mechanism 40 is in the connected state, since $\omega 1 = -\omega 2$ is established, a converted total driving torque τtt1 of the first link 30 is as shown in Equation (B5) as follows.

$$\tau tt1 = \tau m1 - \tau m2 \quad (B5)$$

According to the principle of virtual work, Equation (B6) as follows is established.

$$\tau tt1 \cdot d\theta 1 = Ft \cdot L1 \cdot d\theta 1 \quad (B6)$$

From Equation (B6) and Equation (B2) above, Equation (B7) as follows is derived.

$$\tau tt1 = Ft \cdot L1 = F \cdot L1 \cdot \sin \theta 1 \quad (B7)$$

Here, with the power transmission mechanism 40 being in the connected state, by setting the torque transmitted between the first joint 10 and the second joint 20 as a torque τcnst, Equations (B8) and (B9) are derived.

$$\tau 1 = \tau m1 + \tau cnst \quad (B8)$$

$$\tau 2 = \tau m2 - (-\tau cnst) \quad (B9)$$

From Equation (B8) and Equation (B9) above, Equation (B10) as follows is derived.

$$\tau 1+\tau 2=\tau m1+\tau m2+2\cdot\tau cnst \quad (B10)$$

By rearranging Equation (B10) for the transmission torque τcnst, the following equation (B11) is obtained.

$$\tau cnst=\{\tau 1+\tau 2-(\tau m1+\tau m2)\}/2 \quad (B11)$$

From Equations (B8) to (B11), technical aspects as follows are derived. For example, it is assumed that the external force is supported by only the first motor torque τm1 because the second motor 21 is in the overload/overheat state.

In this case, since τm2=0 is established, by substituting it into Equation (B9), τcnst=τ2 is derived, and by substituting into Equation (B4), Equation (B12) as follows is derived.

$$\tau cnst=F\cdot L2\cdot\sin(\theta 1+\theta 2) \quad (B12)$$

In addition, by substituting τm2=0 into Equation (B5), τtt1=τm1 is derived, and by substituting this into Equation (B7), Equation (B13) as follows is derived.

$$\tau m1=F\cdot L1\cdot\sin\theta 1 \quad (B13)$$

As is apparent by comparing with the first torque τ1 of Equation (B3), it is determined that the first motor torque τm1 of this equation (B13) has a smaller value. That is, it is determined that, in the case where the power transmission mechanism 40 is in the connected state, the external force F can be supported by only the first motor torque τm1 whose value is smaller than the case of the disconnected state. This is because the transmission torque τcnst acts to support the component Fa in the case where the power transmission mechanism 40 is in the connected state.

Then, the case where the outputs of the first motor 11 and the second motor 21 are set to be the same will be described. In this case, since τm1=−τm2 is established due to the relationship ω1=−ω2, by substituting this into Equation (B11), Equation (B14) as follows is derived.

$$\tau cnst=(\tau 1+\tau 2)/2 \quad (B14)$$

Meanwhile, by arranging Equation (B8) for the first motor torque τm1, Equation (B15) as follows is derived.

$$\tau m1=\tau 1-\tau cnst \quad (B15)$$

By substituting (B14) above into τcnst of Equation (B15), Equation (B16) as follows is derived.

$$\tau m1=(\tau 1-\tau 2)/2 \quad (B16)$$

By respectively substituting Equations (B3) and (B4) above into τ1 and τ2 of Equation (B16), eventually, Equation (B17) as follows is derived.

$$\tau m1=(F\cdot L1\cdot\sin\theta 1)/2 \quad (B17)$$

In the case where the first motor torque τm1 of Equation (B17) is compared with the first torque τ1 of Equation (B3), it is determined that the first motor torque τm1 has a very small value as compared with the first torque τ1 of Equation (B3).

That is, compared with the case of the disconnected state, in the case where the power transmission mechanism 40 is in the connected state, it is determined that the external force F can be supported by the first motor torque τm1 whose value is very small and the second motor torque τm2. This is because, in the case where the motor transmission mechanism 40 is in the connected state, in addition to that the transmission torque τcnst acts to support the component Fa, the planetary gear mechanism 43 and the electromagnetic brake 44, etc., which support the transmission torque τcnst, are smaller and lighter than those in a conventional motor.

Figure 7:
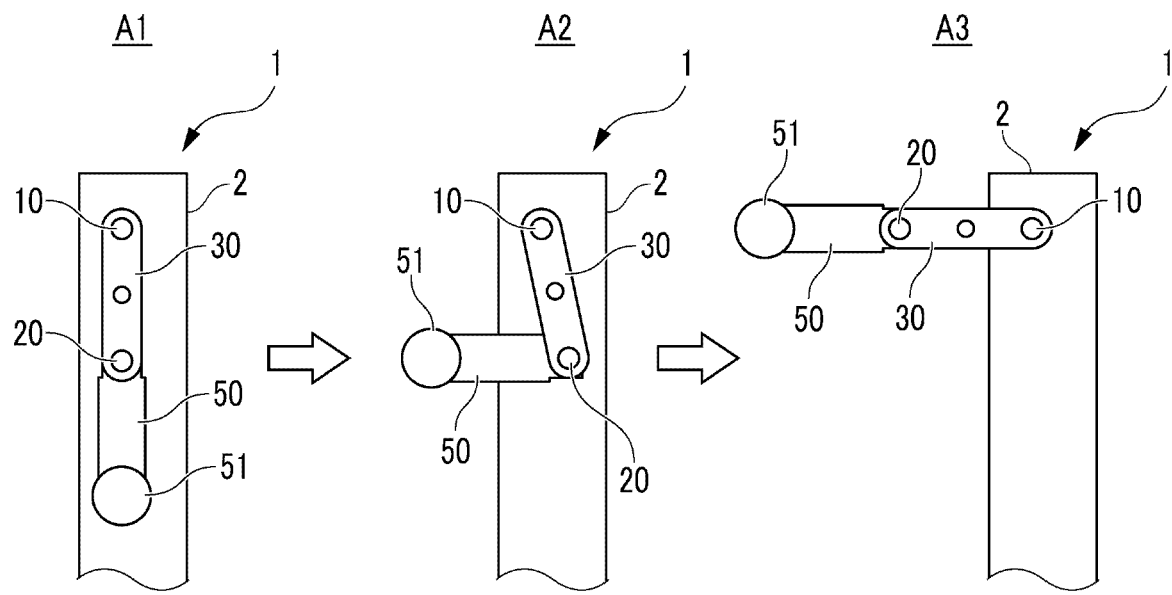
FIG. 7 is a view illustrating an example of an operation test at the time when the power transmission mechanism is switched from a disconnected state to the connected state during operation of the link mechanism.

Then, the function and the effect of the power transmission mechanism 40 in the link mechanism 1 are described with reference to FIGS. 7 to 10. FIG. 7 represents an example of the operation test at the time when the power transmission mechanism 40 is switched from the disconnected state to the connected state during operation of the link mechanism 1. Comparatively, FIG. 9 represents an example of the operation test at the time when the power transmission mechanism 40 is maintained in the disconnected state during operation of the link mechanism 1.

To begin with, the operation test of FIG. 7 is described. The operation test of FIG. 7 is implemented as explicated below. First, with the power transmission mechanism 40 maintained in the disconnected state, the first motor 11 and the second motor 21 being driven, and the first joint 10 being rotated in the counter-clockwise direction in the figure while the second joint 20 being rotated in the clockwise direction in the figure, the link mechanism 1 is changed from a posture A1 to a posture A2.

Then, in the state of the posture A2, the electromagnetic brake 44 is turned on, and the power transmission mechanism 40 is changed from the disconnected state to the connected state. Then, the first motor 11 and the second motor 21 are driven, and the first joint 10 is rotated in the clockwise direction in the figure while the second joint 20 is rotated in the counter-clockwise direction in the figure. Accordingly, the link mechanism 1 is changed from the posture A2 in the figure to a posture A3.

Figure 8:
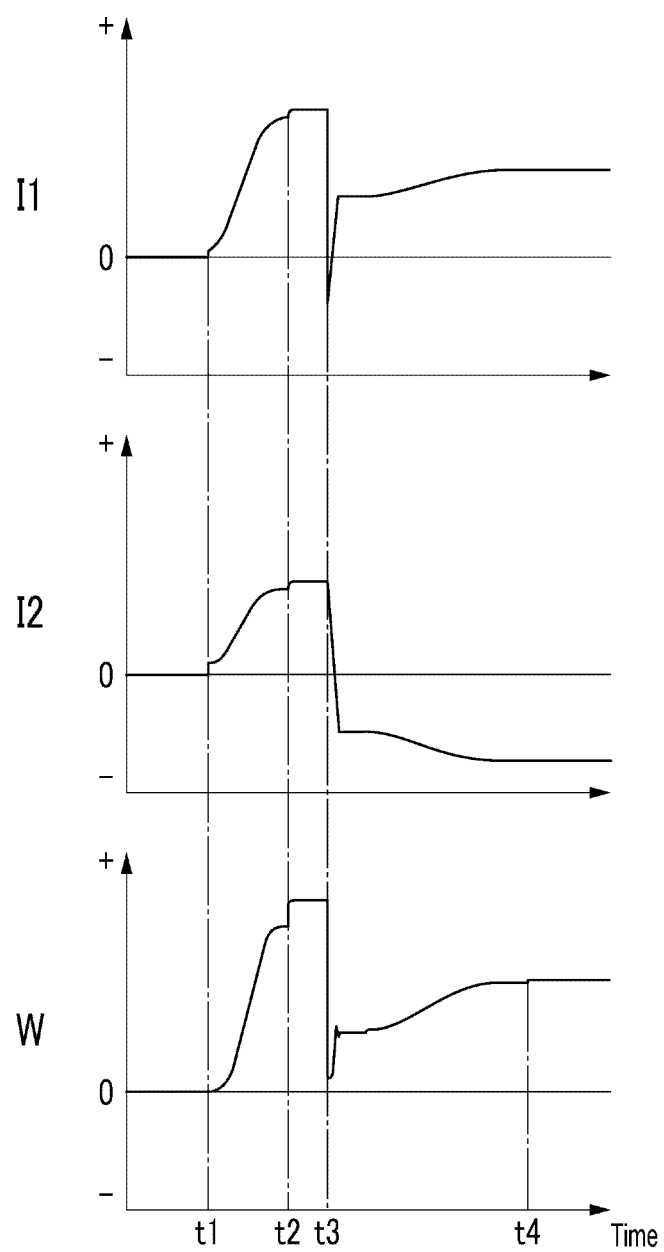
FIG. 8 is a view illustrating an example of a measurement result of currents of a first motor and a second motor and a total consumed power at the time when the operation test of FIG. 7 is executed.
Figure 9:
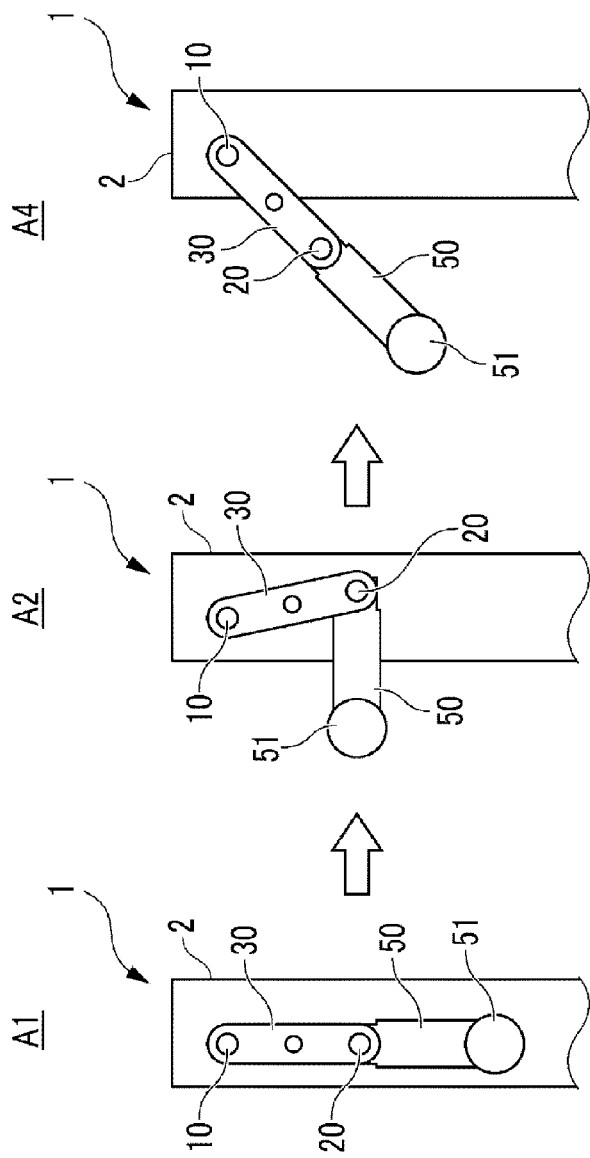
FIG. 9 is a view illustrating an example of an operation test at the time when the power transmission mechanism is maintained in the disconnected state during operation of the link mechanism.

FIG. 8 represents an example of a measurement result of currents I1 and I2 of the first motor 11 and the second motor 21 and a total consumed power W of the two motors 11 and 12 at the time when the operation test of FIG. 7 is executed as the above. As shown in the same figure, when the current supply to the first motor 11 and the second motor 21 is started at a time t1 from the state where the link mechanism 1 is in the posture A1, the currents I1 and I2 and the total consumed power W increase since then, and the link mechanism 1 changes from the posture A1 to the posture A2.

Then, at a time t2, after the link mechanism 1 reaches the posture A2, the currents I1 and I2 and the total consumed power W are in a flat state. Then, at a time t3, when the power transmission mechanism 40 changes from the disconnected state to the connected state, at the same time, the currents I1 and I2 and the total consumed power W temporarily decrease drastically for the above reasons. Then, in order for the link mechanism 1 to change from the posture A2 to the posture A3 in the drawing, the absolute values of the current I1 and the current I2 start increasing, and the total consumed power W also starts increasing. Then, at a time t4, when the link mechanism 1 reaches the posture A3, the currents I1 and I2 and the total consumed power W are in a flat state.

Meanwhile, the operation test of FIG. 9 is implemented as explicated below. First, like the case of FIG. 7, with the power transmission mechanism 40 maintained in the disconnected state and the first motor 11 and the second motor 21 being driven, the link mechanism 1 is changed from the posture A1 in the figure to the posture A2. Then, the first motor 11 and the second motor 21 are driven, and the first joint 10 is rotated in the clockwise direction in the figure while the second joint 20 is rotated in the counter-clockwise direction in the figure, so as to change from the posture A2 to the posture A3 shown in FIG. 7.

At this time, with the power transmission mechanism 40 being in the disconnected state, the transmission torque τcnst is in a non-functioning state, and as a result, the current I1 of the first motor 11 reaches an upper limit current I_LMT, as to be described afterwards. As a result, the first link 30 does not reach the posture A3 of FIG. 7, but stops at a posture A4 of FIG. 9.

Figure 10:
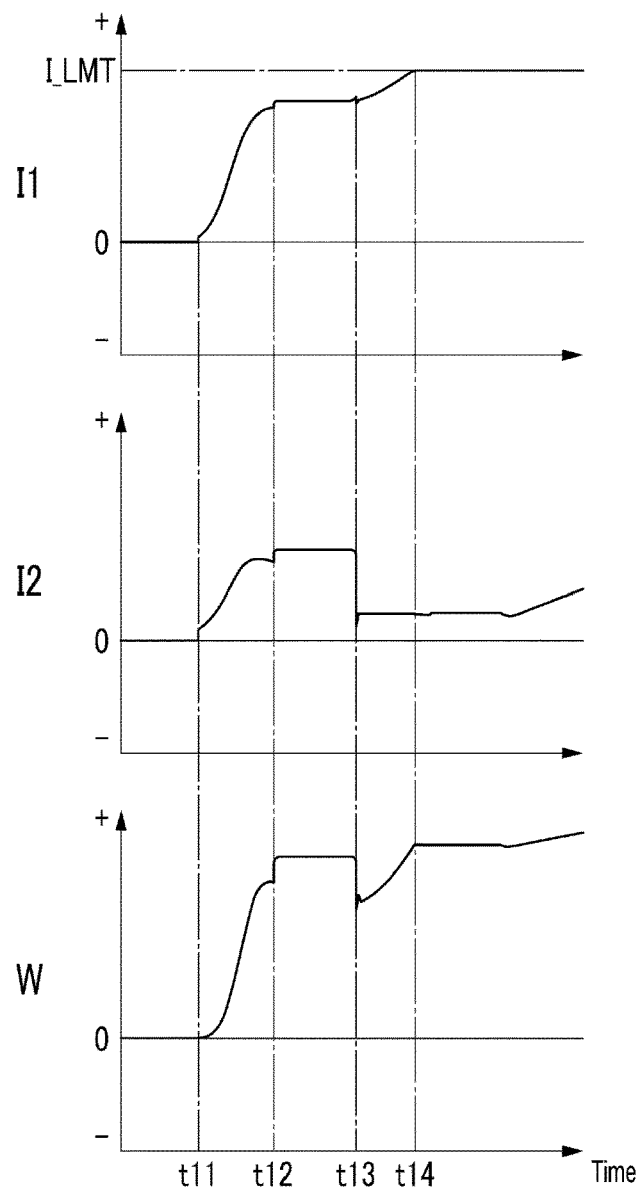
FIG. 10 is a view illustrating an example of a measurement result of the currents of the first motor and the second motor and the total consumed power at the time when the operation of FIG. 9 is executed.

FIG. 10 represents an example of a measurement result of the currents I1 and I2 and the total consumed power W at the time when the operation test of FIG. 9 is executed as the above. As shown in the same figure, when the current supply to the first motor 11 and the second motor 21 is started at the time t1 from the state where the link mechanism 1 is in the posture A1, the currents I1 and I2 and the total consumed power W increase since then, and the link mechanism 1 changes from the posture A1 to the posture A2.

Then, at a time t12, after the link mechanism 1 reaches the posture A2, the currents I1 and I2 and the total consumed power W are in a flat state, and the link mechanism 1 is maintained at the posture A2. Then, when the first motor 11 and the second motor 21 are driven to change from the posture A2 to the posture A3, even though the current I2 is in the flat state at a time t13, the current I1 increases and reaches the upper limit current I_LMT at a time t14. Since the upper limit current I_LMT is a value for preventing overcurrent of a motor, the torque of the first motor 11 is limited. As a result, the link mechanism 1 does not reach the posture A3, but is maintained at the posture A4.

In FIGS. 8 and 10 above, the scale widths of the vertical axis of the total consumed power W are set to be the same as each other. Therefore, as is apparent by comparing the two figures, by switching the power transmission mechanism 40 from the disconnected state to the connected state, it is determined that the total consumed power W can be reduced as compared with the time when the power transmission mechanism 40 is maintained at the disconnected state.

Based on the above, according to the link mechanism 1 of the present embodiment, the first link 30 is driven by the first motor 11 to rotate about the rotating shaft of the first joint 10, and the second link 50 is driven by the second motor 21 to rotate about the rotating shaft of the second joint 20. In addition, the power transmission mechanism 40 is configured as being able to switch between the connected state and the disconnected state, and in the case where the power transmission mechanism 40 is in the connected state, the transmission torque τcnst can be transmitted between the first joint 10 and the second joint 20. In addition, in the case where the power transmission mechanism 40 is in the connected state, the first joint 10 and the second joint 20 rotate so that ω1=−ω2 is established between the angular velocity ω1 of the first joint 10 and the angular velocity ω2 of the second joint 20.

Therefore, in the case where the external force F acts on the second link 50, the external force F can be supported by the first motor torque τm1, the second motor torque τm2, and the transmission torque τcnst. Accordingly, compared with the case where the external force F acting on the second link is supported by the first motor torque τm1 and the second motor torque τm2, the external force F can be supported while the two motor torques τm1 and τm2 can be reduced. Therefore, the power consumption of the two motors 11 and 21 can be reduced, and the sizes and the weights of the motors 11 and 12 can be reduced. Accordingly, the running cost can be reduced.

In addition, in the case where the power transmission mechanism 40 is in the connected state, by maintaining the sun gear 43a of the planetary gear mechanism 43 to be non-rotatable by the electromagnetic brake 44, the rotating shaft 11a which inputs the torque of the first motor 11 to the first decelerator 12 and the rotating shaft 21a which inputs the torque of the second motor 21 to the second decelerator 22 are connected via the four pulleys 41, 43f, 43g, and 46, the two belts 42 and 45, and the planetary gear mechanism 43.

Accordingly, since the power transmission mechanism 40 can be switched from the disconnected state to the connected state by connecting the elements 11a and 21a on the input sides of the two decelerators 12 and 22, compared with the case where the elements 11a and 21a on the output side of the two decelerators are connected, the torque capacity in the power transmission mechanism 40 can be reduced, and the size and the weight of the power transmission mechanism 40 and the cost can be reduced accordingly.

Moreover, since the two rotating shafts 11a and 21a are connected via the planetary gear mechanism 43, by suitably selecting the rotation element maintained as non-rotatable by the electromagnetic brake 44 from the three rotation elements of the planetary gear mechanism 43, the rotating directions of the first joint 10 and the second joint 20 can be set as the same direction or opposite directions at the time when the power transmission mechanism 40 is in the connected state.

While the first embodiment is an example using, as a power transmission mechanism, the power transmission mechanism 40 in which the four pulleys 41, 43f, 43g, and 46, the two belts 42 and 45, the planetary gear mechanism 43, and the electromagnetic brake 44 are assembled, the power transmission mechanism of the invention is not limited thereto, and may also be any configuration switchable between the connected state in which the first joint and the second joint are connected and a disconnected state where the connection is removed. For example, as the power transmission mechanism, a gear mechanism may be used, and a mechanism in which a gear and a chain are assembled or a hydraulic pneumatic circuit, etc., may also be used. In addition, as the switching mechanism for connecting and disconnecting, an electromagnetic clutch, a hydraulic clutch, or a valve switching mechanism in a hydraulic pneumatic circuit may also be used.

In addition, while the first embodiment is an example using, as the first actuator, the first motor 11 that is an AC motor, the first actuator of the invention is not limited thereto, and may also be one that drives the first link to rotate about the rotating shaft of the first joint. For example, as the first actuator, a DC motor may be used, a combination of a linear actuator such as a linear motor or a hydraulic actuator, etc., and a gear may be used, a spring, etc., may also be used. In addition, it may also be configured that a linear actuator is used as the first actuator, and the first joint is rotated by driving the first link by the linear actuator, like Patent Document 1.

In addition, while the first embodiment is an example using, as the second actuator, the second motor 21 that is an AC motor, the second actuator of the invention is not limited thereto, and may also be one that drives the second link to rotate about the rotating shaft of the second joint. For example, as the second actuator, a DC motor may be used, a combination of a linear actuator such as a linear motor or a hydraulic actuator, etc., and a gear may be used, a spring, etc., may also be used. In addition, it may also be configured that a linear actuator is used as the second actuator, and the second joint is rotated by driving the second link by the linear actuator, like Patent Document 1.

Meanwhile, while the first embodiment is an example in which the rotating shaft 11a of the first motor 11 serves as the first element, the first element of the invention is not limited thereto and may also be one that inputs the power of the first actuator to the first decelerator. For example, as the first element, a gear, a gear mechanism, and a pulley mechanism etc., may be used.

In addition, while the first embodiment is an example in which the rotating shaft 21a of the second motor 21 serves as the second element, the second element of the invention is not limited thereto and may also be one that inputs the power of the second actuator to the second decelerator. For example, as the second element, a gear, a gear mechanism, and a pulley mechanism etc., may be used.

Moreover, while the first embodiment is an example in which the electromagnetic brake 44 is used as the rotation stop mechanism, the rotation stop mechanism of the invention is not limited thereto and may also be one capable of maintaining one of the rotation elements of the planetary gear mechanism in the non-rotatable state. For example, as the rotation stop mechanism, a powder brake or a hydraulic brake may also be used.

Meanwhile, while the first embodiment is an example in which one that is of the wave gear mechanism type is used as the first decelerator, the first decelerator of the invention is not limited thereto and may also be one that decelerates and transmits the power of the first actuator to the first link. For example, as the first decelerator, a helical gear decelerator or a hypoid gear decelerator, etc., may be used.

In addition, while the first embodiment is an example in which one that is of the wave gear mechanism type is used as the second decelerator, the second decelerator of the invention is not limited thereto and may also be one that decelerates and transmits the power of the second actuator to the second link. For example, as the second decelerator, a helical gear decelerator or a hypoid gear decelerator, etc., may be used.

In the following, a link mechanism 1A of the second embodiment will be described with reference to FIG. 11. Except for a portion, the link mechanism 1A has the same configuration as the link mechanism 1 of the first embodiment. Therefore, in the following, the configuration same as the link mechanism 1 of the first embodiment is labeled with the same symbols, and the descriptions thereof will be omitted. Only the differences will be described.

In the case of the link mechanism 1A, differing from the link mechanism 1 of the first embodiment, the second joint 20 is fixed to the base 2 independently of the first link 30. Therefore, in the link mechanism 1A, in the case where the power transmission mechanism 40 is in the disconnected state, the two joints 10 and 20 can freely rotate independently from each other.

Figure 11:
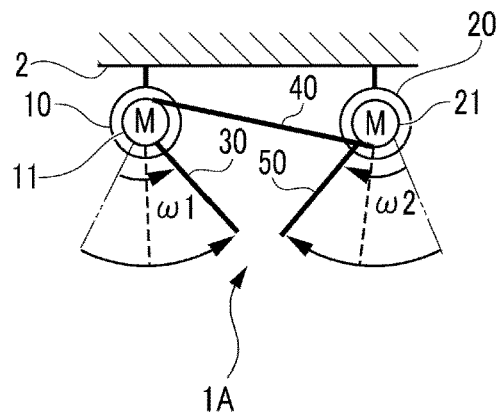
FIG. 11 is a schematic view illustrating a configuration of a link mechanism according to a second embodiment.

In addition, in the case where the power transmission mechanism 40 is in the connected state, as shown in FIG. 11 and like the link mechanism 1 of the first embodiment, the two joints 10 and 20 are configured to rotate with respect to each other in the state in which $\omega 1 = -\omega 2$ is established.

According to the link mechanism 1A of the present embodiment configured as the above, in the case where the power transmission mechanism 40 is in the connected state, at the time when an external force acts on one or both of the first link 30 and the second link 50, the external force can be supported by the torques $\tau m1$ and $\tau m2$ of the two motors 11 and 21 and the transmission torque $\tau cnst$. Therefore, the link mechanism 1A is suitable to be used under the condition that a great external force acts on one of the first link 30 and the second link 50 and a small external force acts on the other of the first link 30 and the second link 50 or under the condition that the transmission torque $\tau cnst$ is dominant.

Figure 12:
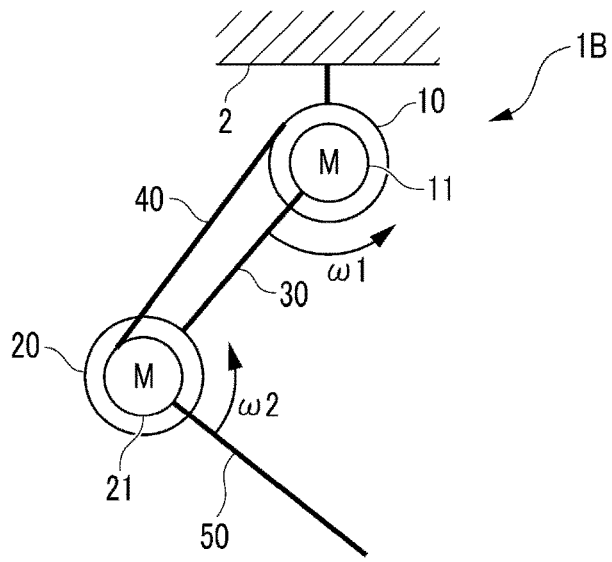
FIG. 12 is a schematic view illustrating a configuration of a link mechanism according to a third embodiment.

Then, a link mechanism 1B according to the third embodiment will be described with reference to the FIGS. 12 to 13. Except for a portion, the link mechanism 1B of the present embodiment has the same configuration as the link mechanism 1 of the first embodiment. Therefore, in the following, the configuration same as the link mechanism 1 of the first embodiment is labeled with the same symbols, and the descriptions thereof will be omitted. Only the differences will be described.

In the link mechanism 1B, the casing and the stator of the second motor 21 are fixed to the first link 30. In addition, the end part of the flexspline of the second decelerator 22 on the side of the first link 30 is fixed to the first link 30, and the circular spline is fixed to the end part of the second link 50 on the side of the second decelerator 22. Given the above configuration, it is configured that, when the rotating shaft 21a of the second motor 21 rotates, the second link 50 rotates in the same direction as the rotation of the rotating shaft of the second motor 21.

Accordingly, in the link mechanism 1B, it is configured that in the case where the power transmission mechanism 40 is in the connected state, differing from the link mechanism 1 of the first embodiment, the two joints 10 and 20 rotate in the state in which $\omega 1 = \omega 2$ is established.

Figure 13:
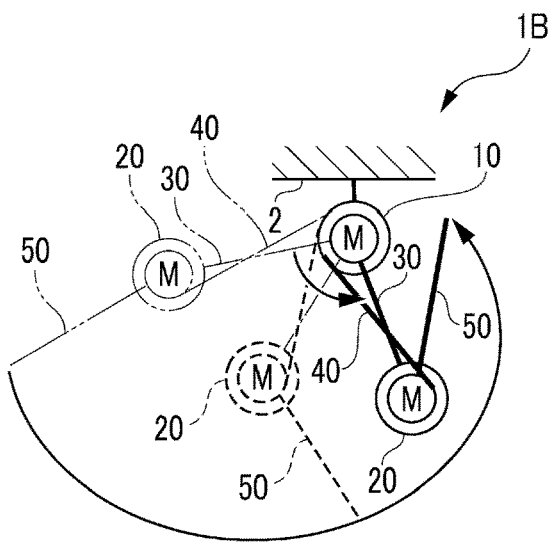
FIG. 13 is a schematic view illustrating an operation example at the time when a power transmission mechanism in the link mechanism of the third embodiment is in the connected state.

With the above configuration, in the link mechanism 1B, in the case where the power transmission mechanism 40 is in the connected state, at the time when the first motor 11 and the second motor 22 rotate, the first link 30 and the second link 50 operate, for example, as shown in FIG. 13.

That is, in the case where the first link 30 and the second link 50 are at the locations indicated by the two-dot chain lines shown in the figure, with the first motor 11 rotating in the counter-clockwise direction in the figure, the first link 30 rotates about the rotating shaft of the first motor 11 in the counter-clockwise direction. Accordingly, the first link 30 moves from the location indicated by the two-dot chain line of the figure to the location indicated by the solid line via the location indicated by the broken line.

At the same time, with the second motor 21 rotating in the counter-clockwise direction in the figure, the second link 50 rotates about the rotating shaft of the second motor 21 in the counter-clockwise direction. Accordingly, the second link 50 moves from the location indicated by the two-dot chain line of the figure to the location indicated by the solid line via the location indicated by the broken line.

According to the link mechanism 1B of the present embodiment as configured as the above, the effects same as the link mechanism 1 of the first embodiment can also be attained.

In the following, a link mechanism 1C of the fourth embodiment will be described with reference to FIG. 14. Except for a portion, the link mechanism 1C has the same configuration as the link mechanism 1A of the second embodiment. Therefore, in the following, the configuration same as the link mechanism 1A of the second embodiment is labeled with the same symbols, and the descriptions thereof will be omitted. Only the differences will be described.

Figure 14:
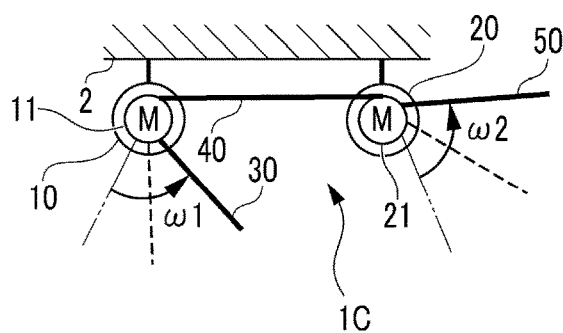
FIG. 14 is a schematic view illustrating a configuration of a link mechanism according to a fourth embodiment.

In the case of the link mechanism 1C, it is configured that, at the time when the power transmission mechanism 40 is in the connected state, as shown in FIG. 14, the two joints 10 and 20 rotate with respect to each other in the state in which $\omega 1 = \omega 2$ is established.

According to the link mechanism 1C of the present embodiment configured as the above, in the case where the power transmission mechanism 40 is in the connected state, at the time when an external force acts on one of the first link 30 and the second link 50, the external force can be supported by the torques τm1 and τm2 of the two motors 11 and 21 and the transmission torque τcnst, like the link mechanism 1A of the second embodiment. Therefore, like the link mechanism 1A of the second embodiment, the link mechanism 1C is suitable to be used under the condition that a great external force acts on one of the first link 30 and the second link 50 and a small external force acts on the other of the first link 30 and the second link 50 or under the condition that the transmission torque τcnst is dominant.

In addition, while the first to fourth embodiments are examples in which the proportional coefficient p is set as the value −1 or the value 1, as described above, the proportional coefficient p of the power transmission mechanism 40 can be set as various values which are positive or negative real numbers other than the value 0. In addition, it may be configured to change the proportional coefficient p during operation by using CVT, etc.

In addition, the first to fourth exemplary embodiments are examples in which the power transmission mechanism 40 is configured so that, at the time when the power transmission mechanism 40 is in the connected state, the torque of the first motor 11 and the torque of the second motor 21 can be transmitted between the first joint 10 and the second joint 20 in both directions. However, the power transmission mechanism 40 may also be configured to be, at the time when the power transmission mechanism 40 is in the connected state, in a first state in which only the torque of the first motor 11 can be transmitted from the first joint 10 to the second joint 20. In addition the power transmission mechanism 40 may also be configured to be, at the time when the power transmission mechanism 40 is in the connected state, in a second state in which only the torque of the second motor 21 can be transmitted from the second joint 20 to the first joint 10.

In addition, while the first to fourth embodiments are examples in which the angular velocities ω1 and ω2 are respectively used as the rotation velocities of the first joint 10 and the second joint 20, in place thereof, rotation velocities whose representation units are rpm or rps or velocities represented in other units may also be used.

Moreover, while the first to fourth embodiments are examples in which, as the first joint and the second joint, the first joint 10 and the second joint 20 rotating about the rotating shafts are used, a linear joint may also be used as at least one of the first joint and the second joint.

For example, in the case where one of the first joint and the second joint is a linear joint and the other of the first joint and the second joint is a joint rotating about the rotating shaft, when the power transmission mechanism is in the connected state and the power of the first joint and the power of the second joint are transmitted via the power transmission mechanism, the velocity of one of the first joint and the second joint is converted into the same dimension of the velocity of the other. That is, the proportional coefficient between the first joint and the second joint is determined by the configuration of the power transmission mechanism. The above configuration is equivalent to that, in the case where the power transmission mechanism is in the connected state, the first joint and the second joint operate so that the velocity of the first joint and the velocity of the second joint are proportional to each other.

Figure 15:
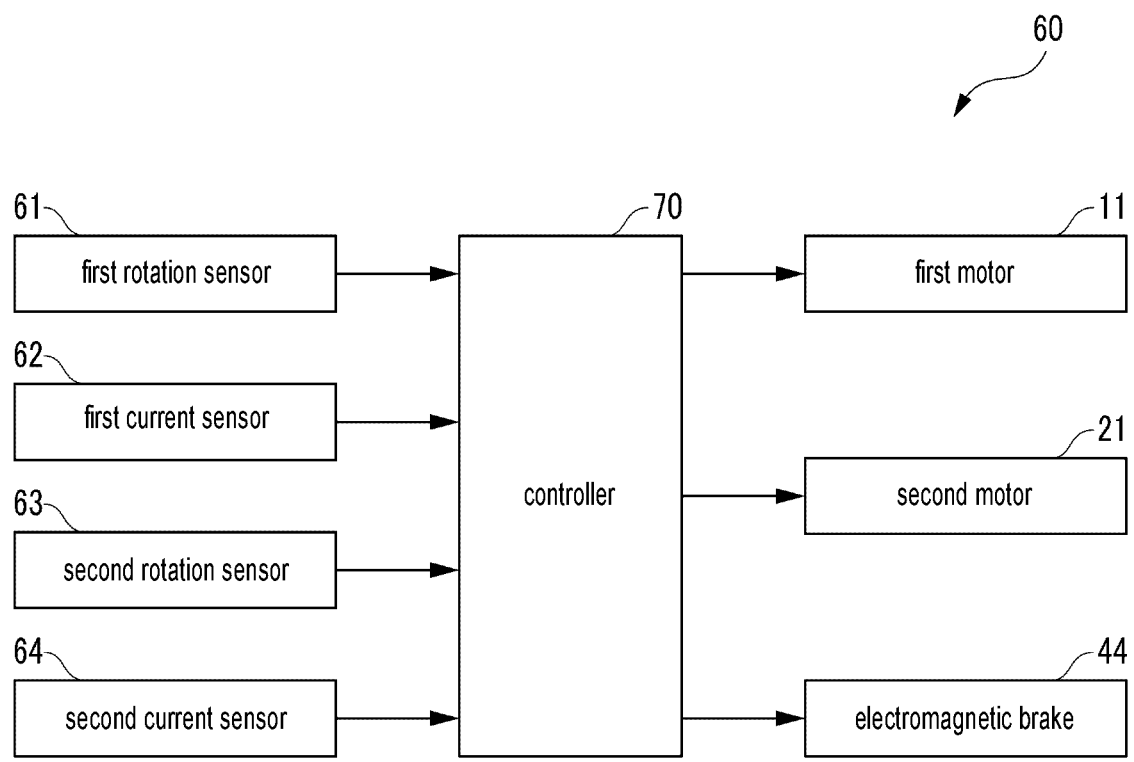
FIG. 15 is a block diagram illustrating an electrical configuration of a control device.

In the following, a control device 60 of the present embodiment will be described with reference to FIG. 15. As shown in the same figure, the control device 60 includes a controller 70, a first rotation sensor 61, a first current sensor 62, a second rotation sensor 63, and a second current sensor 64.

The first rotation sensor 61 is configured as a rotary encoder, detects a rotation angle θ1 (referred to as "first rotation angle" in the following) and the angular velocity ω1 (referred to as "first angular velocity" in the following) of the first motor 11, and outputs a detection signal representing the rotation angle θ1 and the angular velocity ω1 to the controller 70.

In addition, the first current sensor 62 detects the current I1 (referred to as "first current" in the following) flowing through the first motor 11 and outputs a detection signal representing the current I1 to the controller 70.

Moreover, like the first rotation sensor, the second rotation sensor 63 is configured as a rotary encoder, detects a rotation angle θ2 (referred to as "second rotation angle" in the following) and the angular velocity ω2 (referred to as "second angular velocity" in the following) of the second motor 21, and outputs a detection signal representing the rotation angle θ2 and the angular velocity ω2 to the controller 70.

In addition, the second current sensor 64 detects the current I2 (referred to as "second current" in the following) flowing through the second motor 21 and outputs a detection signal representing the current I2 to the controller 70.

Meanwhile, the controller 70 is configured by a microcomputer including a CPU, a RAM, a ROM, and an I/O interface (not shown), etc., and executes a link mechanism control process to be described in the following in response to the detection signals of the various sensors 61 to 64. In the embodiment, the controller 70 is equivalent to a mechanism control part, a modeling error estimation part, an actuator control part, a virtual velocity calculation part, and a virtual target velocity calculation part.

In the following, the functional configuration of the controller 70 of the present embodiment will be described with reference to FIG. 16. As shown in the same figure, firstly, a target object 100 is defined as a system which sets a target torque vector τ_ref as control input and sets an angular velocity vector ω as output.

The target torque vector τ_ref, as represented in Equation (C1) as follows is a vector with a first target torque τ1_ref and a second target torque τ2_ref as elements, and is calculated in a predetermined control cycle ΔT by the controller 70. The first target torque τ1_ref and the second target torque τ2_ref are respectively the target torques of the first motor 11 and the second motor 21.

[Number C1]

$$\tau\_ref(k) = \begin{bmatrix} \tau1\_ref(k) \\ \tau2\_ref(k) \end{bmatrix} \quad (C1)$$

Each discrete data with the symbol (k) in Equation (C1) above is data calculated in the predetermined control cycle ΔT, and the symbol k (k being a positive integer) represents the control timing (control time) of each discrete data. For example, the symbol k represents the current value calculated (or sampled) at the current control timing, and this point is the same in the following discrete data. In addition, in the following descriptions, the symbol (k) in each discrete data is properly omitted.

In the present embodiment, the first target torque τ1_*ref* is equivalent to the target output of the first actuator, and the second target torque τ2_*ref* is equivalent to the target output of the second actuator.

In addition, the angular velocity vector ω, as shown in Equation (C2) below, is a vector with the first angular velocity ω1 and the second angular velocity ω2 as elements.

[Number C2]

$$\omega(k) = \begin{bmatrix} \omega 1(k) \\ \omega 2(k) \end{bmatrix} \quad (C2)$$

Figure 16:
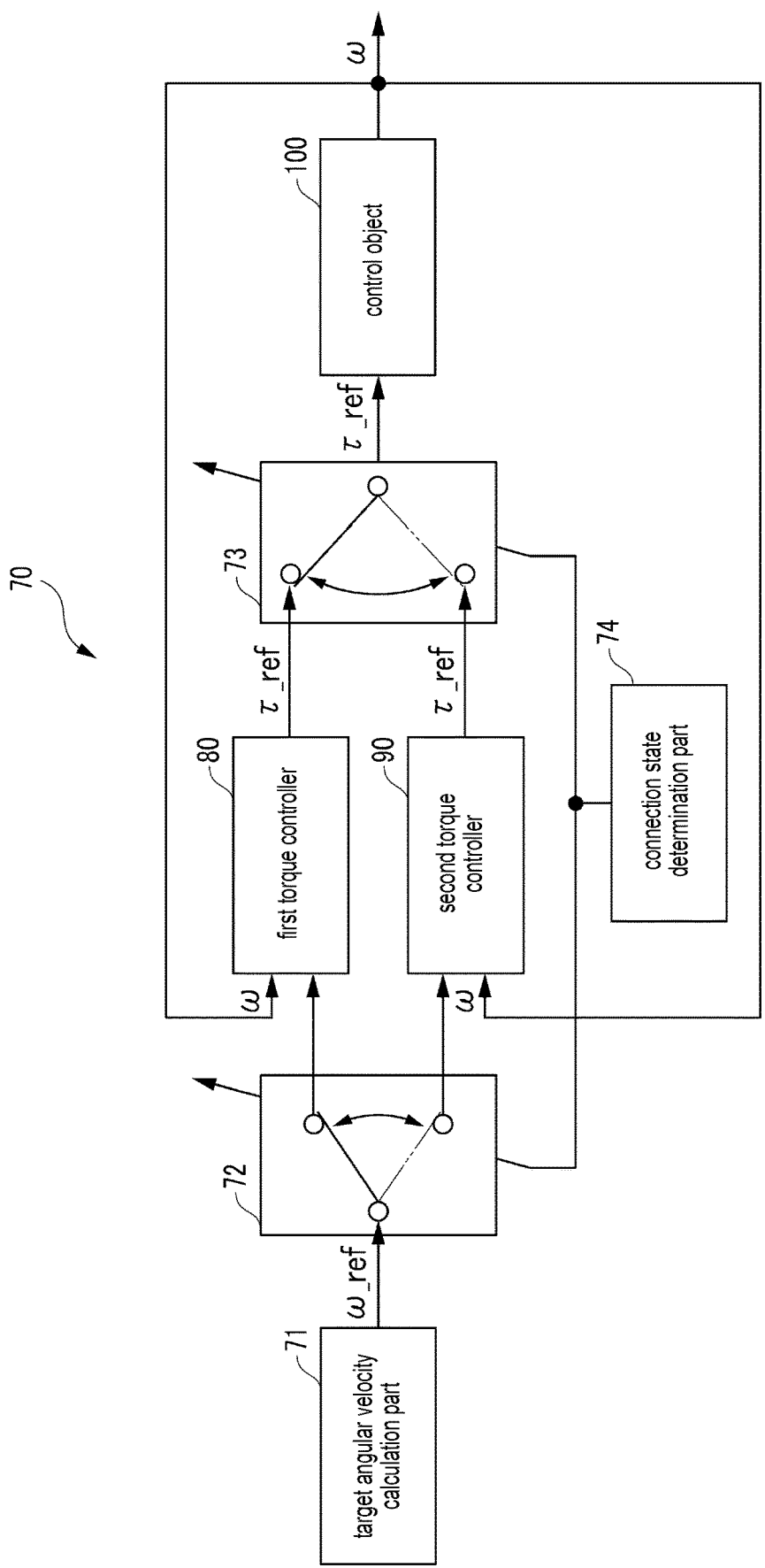
FIG. 16 is a block diagram illustrating a functional configuration of a controller.

As shown in FIG. 16, the controller 70 includes a target angular velocity calculation part 71, two switching parts 72 and 73, a connection state determination part 74, a first torque controller 80, and a second torque controller 90.

The target angular velocity calculation part 71 calculates the target angular velocity vector ω_ref as described below. The target angular velocity vector ω_ref, as shown in Equation (C3) below, has a first target angular velocity ω1_*ref* and a second target angular velocity ω2_*ref* as elements, and the first target angular velocity ω1_*ref* and the second target angular velocity ω2_*ref* are respectively equivalent to the target values of the first and second angular velocities ω1 and ω2.

[Number C3]

$$\omega\_\text{ref}(k) = \begin{bmatrix} \omega 1\_\text{ref}(k) \\ \omega 2\_\text{ref}(k) \end{bmatrix} \quad (C3)$$

In this case, the first target angular velocity ω1_*ref* is calculated according to a predetermined control algorithm so that the first rotation angle θ1 becomes a target value θ1*ref*. In this case, the second target angular velocity ω2_*ref* is calculated according to the predetermined control algorithm so that the second rotation angle θ2 becomes a target value θ2*ref*. In this case, as the predetermined algorithm, various feedforward control algorithms, various feedback control algorithms, and a combination of various feedback control algorithms and feedforward control algorithms may be used, for example. The target angular velocity calculation part 71 calculates the target angular velocity vector ω_ref as described the above and outputs the target angular velocity vector ω_ref to the switching part 72.

In addition, the connection state determination part 74 determines whether the power transmission mechanism 40 is in the connected state and outputs the determination result to the switching parts 72 and 73. Then, at the time when the target angular velocity vector ω_ref from the target angular velocity calculation part 71 and the determination result from the connection state determination part 74 are input, the switching part 72 outputs the target angular velocity vector ω_ref to one of the first torque controller 80 and the second torque controller 90 based on the determination result.

Specifically, the switching part 72 outputs the target angular velocity vector ω_ref to the first torque controller 80 at the time when the power transmission mechanism 40 is in the disconnected state, and outputs the target angular velocity vector ω_ref to the second torque controller 90 at the time when the power transmission mechanism 40 is in the connected state.

The first torque controller 80 calculates the target torque vector τ_ref by means to be described afterwards and outputs the target torque vector τ_ref to the switching part 73. In addition, the second torque controller 90 calculates the target torque vector τ_ref by means to be described afterwards and outputs the target torque vector τ_ref to the switching part 73.

Then, based on the determination result of the connection state determination part 74, at the time when the power transmission mechanism 40 is in the disconnected state, the switching part 73 outputs the target torque vector τ_ref calculated by the first torque controller 80 to the control object 100. Meanwhile, at the time when the power transmission mechanism 40 is in the disconnected state, the target torque vector τ_ref calculated by the second torque controller 90 is output to the control object 100.

Figure 17:
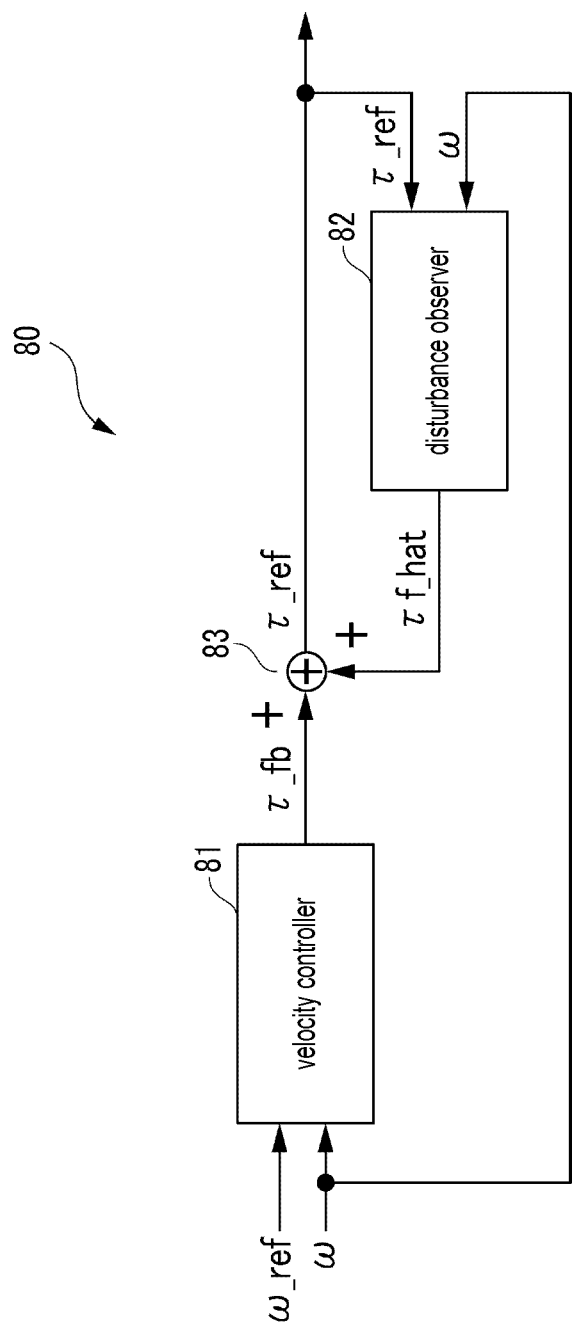
FIG. 17 is a block diagram illustrating a functional configuration of a first torque controller.

Then, the first torque controller 80 will be described. The first torque controller 80 calculates the target torque vector τ_ref at the time when the power transmission mechanism 40 is in the disconnected state and, as shown in FIG. 17, includes a velocity controller 81, a disturbance observer 82, and an adder 83.

The velocity controller 81 calculates a feedback term vector τ_fb of the target torque vector as described below based on the target angular velocity vector ω_ref and the angular velocity vector ω and outputs the feedback term vector τ_fb of the target torque vector to the adder 83.

The feedback term vector τ_fb, as shown in Equation (C4) in the following, is a vector with a first FB control term τ1_*fb* and a second FB control term τ2_*fb* as elements, and the first FB control term τ1_*fb* and the second FB control term τ2_*fb* are calculated by a P control algorithm shown in Equations (C5) and (C6) in the following.

[Number C4]

$$\tau\_\text{fb}(k) = \begin{bmatrix} \tau 1\_\text{fb}(k) \\ \tau 2\_\text{fb}(k) \end{bmatrix} \quad (C4)$$

[Number C5]

$$\tau 1\_\text{fb}(k) = Kp \cdot \{\omega 1\_\text{ref}(k) - \omega 1(k)\} \quad (C5)$$

[Number C6]

$$\tau 2\_\text{fb}(k) = Kp \cdot \{\omega 2\_\text{ref}(k) - \omega 2(k)\} \quad (C6)$$

Kp in Equations (C5) and (C6) above are the predetermined P-term gain.

In this case, the two FB control terms τ1_*fb* and τ2_*fb* may also be calculated by a PID control algorithm, a PD control algorithm, a PI control algorithm, and various feedback control algorithms which are response-specified type control algorithms, etc., in place of the P control algorithm.

In addition, the disturbance observer 82 calculates an estimated error vector τf_hat according to Equation (C7) in the following. Kobs_off in Equation (C7) in the following is a predetermined gain. In the embodiment, the disturbance observer 82 is equivalent to the modeling error estimation part, and the estimated error vector τf_hat is equivalent to a modeling error.

[Number C7]

$$\tau f\_\text{hat}(k) = K\text{obs\_off} \cdot \left\{ \omega(k) - \sum_{i=1}^{k-1} J\text{nom}^{-1} \cdot [\tau\_\text{ref}(i) + \tau f\_\text{hat}(i)] \cdot \Delta T \right\} \quad (C7)$$

The estimated error vector τf_hat, as shown in Equation (C8) in the following, is a vector with two estimated errors τf1_hat and τf2_hat as elements. In addition, Jnom in Equation (C7) above is a nominal value matrix of the inertial moment defined in Equation (C9) in the following.

[Number C8]

$$\tau f\_\text{hat}(k) = \begin{bmatrix} \tau f1\_\text{hat}(k) \\ \tau f2\_\text{hat}(k) \end{bmatrix} \quad (C8)$$

[Number C9]

$$J\text{nom} = \begin{bmatrix} J11 & 0 \\ 0 & J22 \end{bmatrix} \quad (C9)$$

The calculation algorithm of the estimated error vector τf_hat above is derived as described below.

Figure 18:
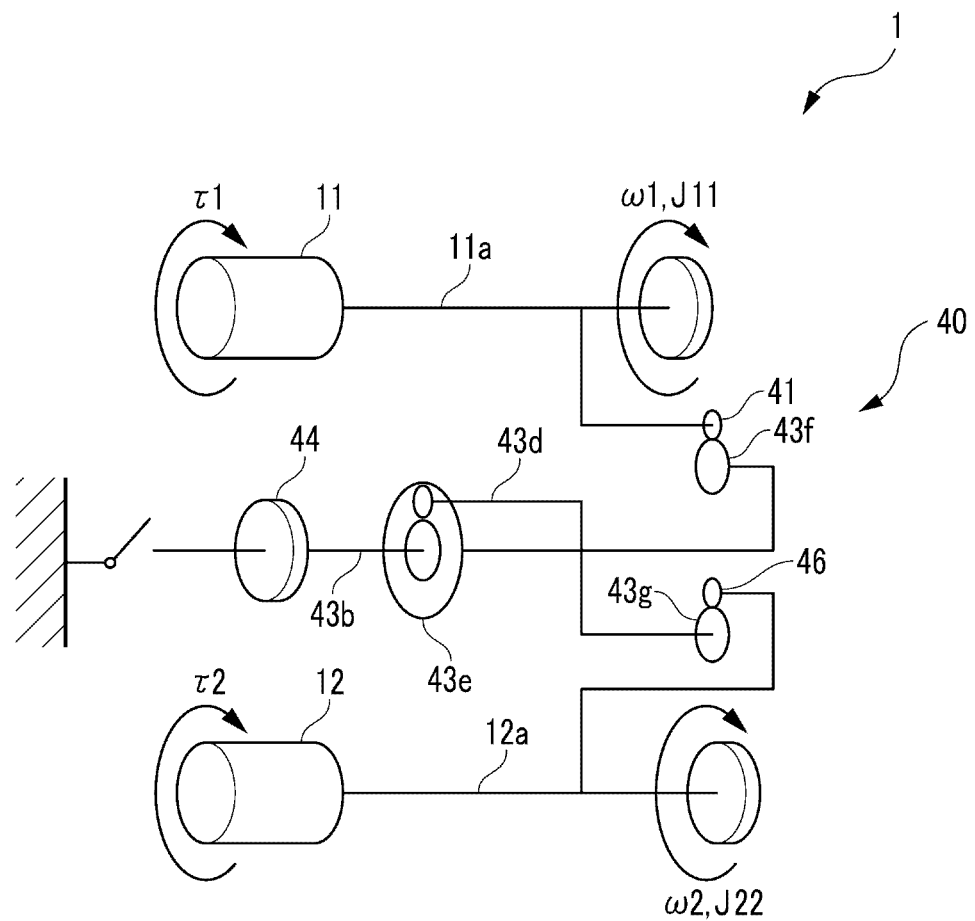
FIG. 18 is an explanatory diagram at the time when the power transmission mechanism of the link mechanism is in the disconnected state.

Firstly, as shown in FIG. 18, the link mechanism 1 of the present embodiment is regarded as a system which generates an inertial moment J11 due to the first motor 11 and the first decelerator 12 and generates an inertial moment J22 due to the second motor 21 and the second decelerator 22. In the system, by modeling the dynamic characteristics at the time when the electromagnetic brake 44 is in the OFF state, i.e., at the time when the power transmission mechanism 40 is in the disconnected state, the model of Equations (C10) to (C15) is obtained.

[Number C10]

$$Jact \cdot D\omega(k) = \tau(k) \quad (C10)$$

[Number C11]

$$Jact = \begin{bmatrix} J11 & J12 \\ J21 & J22 \end{bmatrix} \quad (C11)$$

[Number C12]

$$D\omega(k) = \begin{bmatrix} D\omega1(k) \\ D\omega2(k) \end{bmatrix} \quad (C12)$$

[Number C13]

$$D\omega1(k) = \{\omega1(k) - \omega1(k-1)\}/\Delta T \quad (C13)$$

[Number C14]

$$D\omega2(k) = \{\omega2(k) - \omega2(k-1)\}/\Delta T \quad (C14)$$

[Number C15]

$$\tau(k) = \begin{bmatrix} \tau1(k) \\ \tau2(k) \end{bmatrix} \quad (C15)$$

Jact in Equation (C10) above is an actual inertial moment matrix defined as in Equation (C11) above, and Jnm (n=1 to 2, m=1 to 2) of Equation (C11) above is an inertial moment determined by the first motor 11, the first decelerator 12, the second motor 21, and the second decelerator 22, etc. In addition, Dω of Equation (C10) is an angular acceleration vector defined as Equation (C12) above.

A first angular acceleration Dω1 and a second angular acceleration Dω2, which are elements of the angular acceleration vector Dω, are calculated by Equations (C13) and (C14) above. In addition, τ of Equation (C10) above is an actual torque vector defined as Equation (C15) above. In addition, τ1 and τ2 of Equation (C15) above are respectively a first actual torque and a second actual torque, and are equivalent to the torques actually generated by the first and second motors 11 and 21.

In the present embodiment, the first actual torque τ1 is equivalent to the output of the first actuator, and the second actual torque τ2 is equivalent to the output of the second actuator.

Meanwhile, in the system of FIG. 18, by modeling under the assumption that the power transmission mechanism 40 is not present, a virtual model of Equation (C16) below is obtained.

[Number C16]

$$J\text{nom} \cdot D\omega(k) = \tau(k) \quad (C16)$$

Based on the relationship of Equations (C11) and (C16) above, the influence on the link mechanism 1 due to presence of the power transmission mechanism 40 is captured as the modeling error (i.e., disturbance), and is defined as an error vector τf shown in Equation (C17) as follows. By adding the error vector τf to the virtual model of Equation (C16) above, Equation (C18) in the following is obtained.

[Number C17]

$$\tau f(k) = \begin{bmatrix} \tau f1(k) \\ \tau f2(k) \end{bmatrix} \quad (C17)$$

[Number C18]

$$J\text{nom} \cdot D\omega(k) = \tau(k) + \tau f(k) \quad (C18)$$

Elements τf1 and τf2 of Equation (C17) are respectively a first error and a second error influencing the first and second torques τ1 and τ2.

By replacing the torque vector τ with the target torque vector τ_ref and replacing the error vector τf with the estimated error vector τf_hat in Equation (C18) above, Equation (C19) in the following is obtained.

[Number C19]

$$J\text{nom} \cdot D\omega\_\text{hat}(k) = \tau\_\text{ref}(k) + \tau f\_\text{hat}(k) \quad (C19)$$

Based on Equation (C19), the angular acceleration vector Dω can be defined as in Equation (C20) below.

[Number C20]

$$\omega\_\text{hat}(k) = \sum_{i=0}^{k-1} J\text{nom}^{-1} \cdot \{\tau\_\text{ref}(i) + \tau f\_\text{hat}(i)\} \cdot \Delta T \quad (C20)$$

In addition, the estimated error vector τf_hat can be defined as in Equation (C21) below.

[Number C21]

$$\tau f\_\text{hat}(k) = K\text{obs\_off}\{\omega(k) - \omega\_\text{hat}(k)\} \quad (C21)$$

By substituting Equation (C20) above into Equation (C21), Equation (C7) above can be obtained.

According to the above, the disturbance observer 82 calculates the estimated error vector τf_hat according to Equation (C7) above and outputs the estimated error vector τf_hat to the adder 83.

Then, the adder 83 calculates the target torque vector τ_ref according to Equation (C22) below.

[Number C22]

$$\tau\_ref(k) = \tau\_fb(k) + \tau f\_hat(k) \tag{C22}$$

Figure 19:
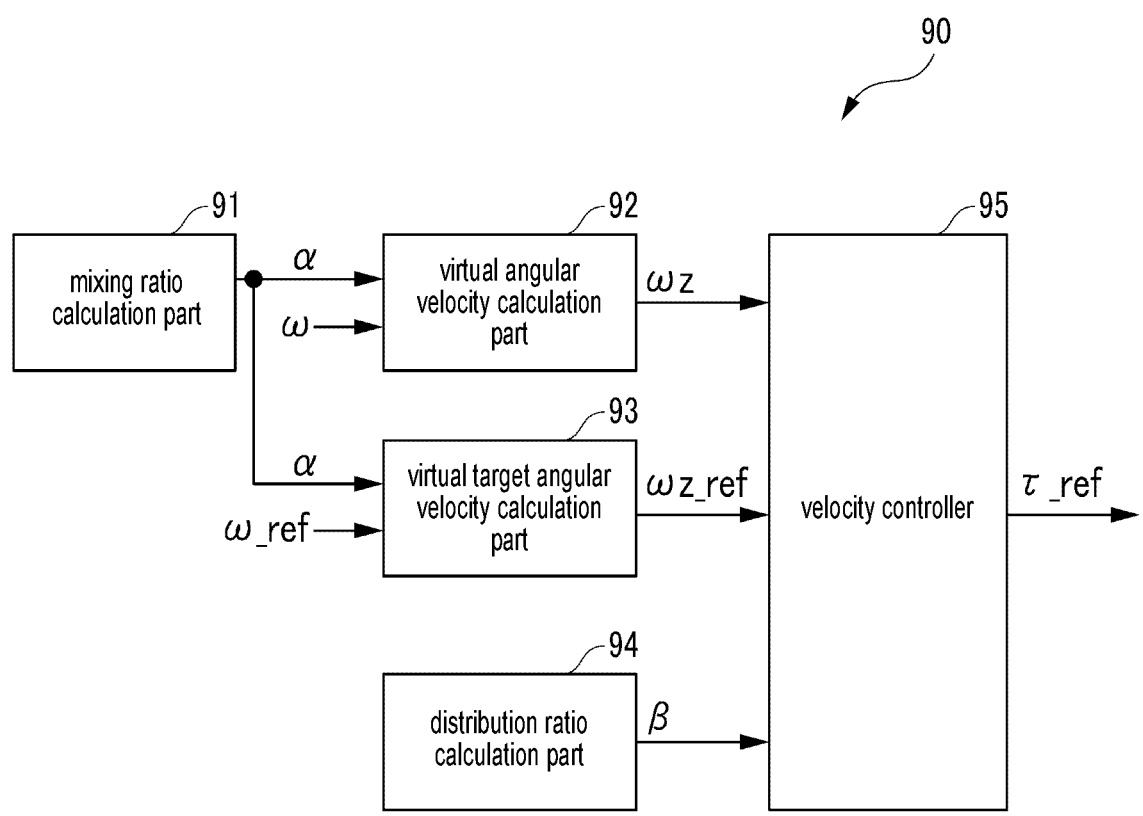
FIG. 19 is a block diagram illustrating a functional configuration of a second torque controller.

Then, the second torque controller 90 will be described. The second torque controller 90 calculates the target torque vector τ_ref at the time when the power transmission mechanism 40 is in the connected state and, as shown in FIG. 19, includes a mixing ratio calculation part 91, a virtual angular velocity calculation part 92, a virtual target angular velocity calculation part 93, a distribution ratio calculation part 94, and a velocity controller 95.

The mixing ratio calculation part 91 calculates a mixing ratio α. The mixing ratio α is used in calculation of a virtual angular velocity ωz and a virtual target angular velocity ωz_ref to be described afterwards, and, specifically, is calculated as a value within a range of 0≤α≤1 by means to be described afterwards.

In addition, the virtual angular velocity calculation part 92 calculates the virtual angular velocity ωz according to Equation (C23) below. In the present embodiment, the virtual angular velocity calculation part 92 is equivalent to the virtual velocity calculation part, and the virtual angular velocity ωz is equivalent to the virtual velocity.

[Number C23]

$$\omega z(k) = \frac{\alpha(k)}{p} \cdot \omega 1(k) + \{1 - \alpha(k)\} \cdot \omega 2(k) \tag{C23}$$

As shown in Equation (C23), the virtual angular velocity ωz is calculated as a weighted average calculation value of a value ω1/p, which divides the first angular velocity ω1 by the proportional coefficient p, and the second angular velocity ω2, with two values α and 1−α serving as weighting coefficients.

In this case, when the angular velocity of the first joint 10 is set as a first joint angular velocity ω1_j, the first joint angular velocity ω1_j is equivalent to a value to which the first angular velocity ω1 is decelerated at the predetermined deceleration ratio. In addition, when the angular velocity of the second joint 20 is set as a second joint angular velocity ω2_j, the second joint angular velocity ω2_j is equivalent to a value to which the second angular velocity ω2 is decelerated at the predetermined deceleration ratio.

Therefore, Equation (23) is equivalent to the definition of the relationship between the first joint angular velocity ω1_j and the second joint angular velocity ω2_j. For the same reason, since ω1_j=p·w2_J is established, it may also be configured that the first angular velocity ω1 and the second angular velocity ω2 of Equation (C23) above are respectively replaced by the first joint angular velocity ω1_j and the second joint angular velocity ω2_j to calculate the virtual angular velocity ωz.

In addition, the virtual target angular velocity calculation part 93 calculates the virtual target angular velocity ωz_ref according to Equation (C24) below. In the present embodiment, the virtual target angular velocity calculation part 93 is equivalent to the virtual target velocity calculation part, and the virtual target angular velocity ωz_ref is equivalent to the virtual target velocity.

[Number C24]

$$\omega z\_ref(k) = \frac{\alpha(k)}{p} \cdot \omega 1\_ref(k) + \{1 - \alpha(k)\} \cdot \omega 2\_ref(k) \tag{C24}$$

As shown in Equation (C24), the virtual target angular velocity ωz_ref is calculated as a weighted average calculation value of a value ω1_ref/p, which divides the first target angular velocity ω1_ref by the proportional coefficient p, and the second target angular velocity ω2_ref, with two values α and 1−α serving as weighting coefficients.

Meanwhile, the distribution ratio calculation part 94 calculates a distribution ratio β. The distribution ratio β is used in calculation of the target torque vector τ_ref to be described afterwards, and is calculated as a value within a range of 0≤β≤1 by means to be described afterwards.

Then, the velocity controller 95 calculates a virtual target torque τz_ref (virtual target output) according to the P control algorithm shown in Equation (C25) in the following.

[Number C25]

$$\tau z\_ref(k) = Kp \cdot \{\omega z\_ref(k) - \omega z(k)\} \tag{C25}$$

In this case, the virtual target torque τz_ref may also be calculated by a PID control algorithm, a PD control algorithm, a PI control algorithm, and various feedback control algorithms which are response-specified type control algorithms, etc., in place of the P control algorithm.

Then, the target torque vector τ_ref is calculated according to Equations (C26) to (C28) in the following.

[Number C26]

$$\tau 1\_ref(k) = \frac{\beta(k)}{p} \cdot \tau z\_ref(k) \tag{C26}$$

[Number C27]

$$\tau 2\_ref(k) = \{1 - \beta(k)\} \cdot \tau z\_ref(k) \tag{C27}$$

[Number C28]

$$\tau\_ref(k) = \begin{bmatrix} \tau 1\_ref(k) \\ \tau 2\_ref(k) \end{bmatrix} \tag{C28}$$

The second torque controller 90 calculates the target torque vector τ_ref according to the calculation algorithm of Equations (C23) to (C28) above. According to the above, in the calculation of the target torque vector τ_ref, the virtual angular velocity ωz, the virtual target angular velocity ωz_ref, and the virtual target torque τz_ref are used for the following reasons.

Figure 20:
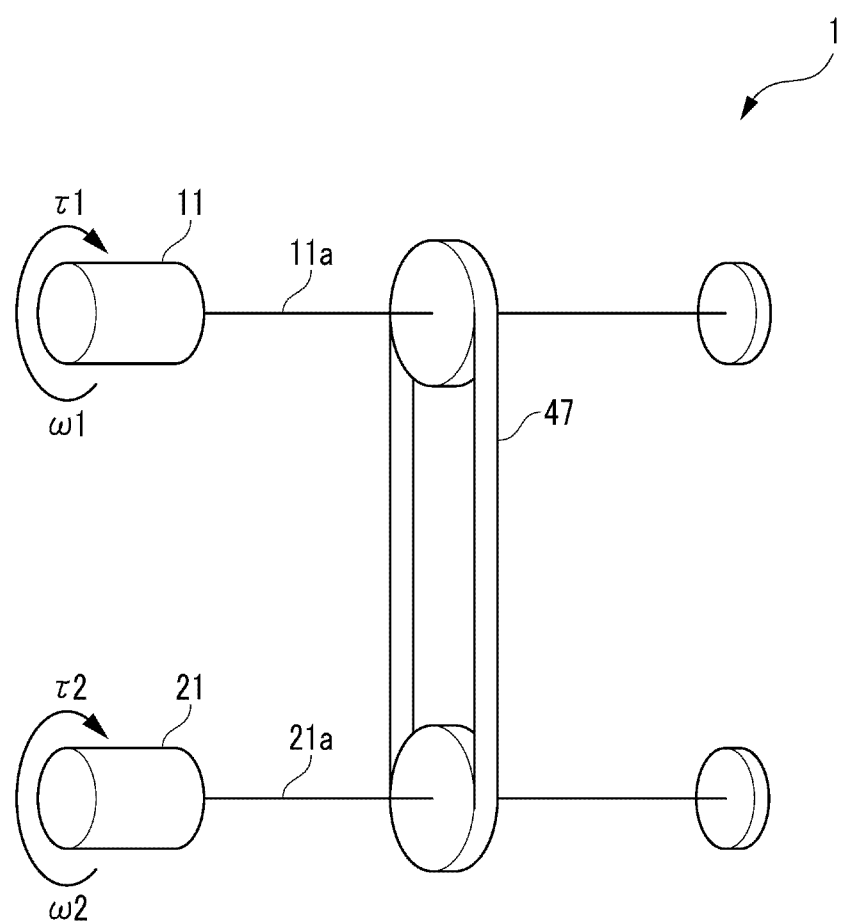
FIG. 20 is a view illustrating a virtual configuration equivalent to the link mechanism at the time when the power transmission mechanism is in the connected state.

That is, in the case of the link mechanism 1 of the present embodiment, at the time when the electromagnetic brake 44 is turned on and the power transmission mechanism 40 enters the connected state, since ω1=p·ω2 is established, as shown in FIG. 20, it is considered that the two rotating shafts 11*a* and 21*a* are directly connected by a virtual pulley mechanism 47. Therefore, at the time when the power transmission mechanism 40 is in the connected state, in a virtual joint where one virtual shaft serves as the rotating shaft, the link mechanism 1 can be controlled by using the virtual angular velocity ωz which is the angular velocity of the virtual shaft.

In the following, the mechanical principle thereof will be described. In the case of the power transmission mechanism 40 of the present embodiment, due to use of the planetary gear mechanism 43, at the time when the electromagnetic brake 44 is turned on to enter the connected state, Equation (C29) is established among the proportional coefficient p and the three gear ratios N1, N2, and r.

[Number C29]

$$p = \frac{2(1+r)}{1+2r} \cdot \frac{N1}{N2} \quad (C29)$$

In addition, by setting a torque acting on the sun gear 43a as τs, Equation (C30) in the following is established.

[Number C30]

$$\begin{bmatrix} J11 & J12 \\ J21 & J22 \end{bmatrix} \begin{bmatrix} D\omega 1 \\ D\omega 2 \end{bmatrix} = \begin{bmatrix} -\frac{(1+2r)}{N1} & 1 & 0 \\ \frac{2(1+r)}{N2} & 0 & 1 \end{bmatrix} \begin{bmatrix} \tau s \\ \tau 1 \\ \tau 2 \end{bmatrix} \quad (C30)$$

If Equation (C30) is re-written into an equation including the torque τs and an equation not including the torque τs, by substituting Equation (C29) above into the equation without the torque τs, Equation (C31) in the following can be obtained.

[Number C31]

$$[p \cdot J11 + J21 \quad p \cdot J12 + J22] \cdot \begin{bmatrix} D\omega 1 \\ D\omega 2 \end{bmatrix} = [p \quad 1] \begin{bmatrix} \tau 1 \\ \tau 2 \end{bmatrix} \quad (C31)$$

By substituting ω1=p·ω2 into Equation (C31), Equation (C32) in the following can be obtained.

[Number C32]

$$[p^2 \cdot J11 + p \cdot (J12 + J21) + J22] \cdot D\omega 2 = [p \quad 1] \begin{bmatrix} \tau 1 \\ \tau 2 \end{bmatrix} \quad (C32)$$

Here, a virtual torque acting on a virtual shaft z is set as a virtual torque τz and is defined as shown in Equation (C33) in the following.

[Number C33]

$$\tau z = [p \quad 1] \begin{bmatrix} \tau 1 \\ \tau 2 \end{bmatrix} \quad (C33)$$

In addition, a virtual inertial moment Jz is defined as shown in Equation (C34) in the following.

[Number C34]

$$Jz = p^2 \cdot J11 + p \cdot (J12 + J21) + J22 \quad (C34)$$

In addition, according to the relationship of ω1=p·ω2, the second angular velocity ω2 can be re-written as in Equation (C35) in the following.

[Number C35]

$$\omega 2 = \alpha \cdot \omega 2 + (1-\alpha)\omega 2 = \begin{bmatrix} \frac{\alpha}{p} & 1-\alpha \end{bmatrix} \begin{bmatrix} \omega 1 \\ \omega 2 \end{bmatrix} \quad (C35)$$

By replacing the second angular velocity ω2 with the virtual angular velocity ωz, Equation (C36) in the following can be obtained. Equation (C35) is equivalent to Equation (C23) above.

[Number C36]

$$\omega z = \begin{bmatrix} \frac{\alpha}{p} & 1-\alpha \end{bmatrix} \begin{bmatrix} \omega 1 \\ \omega 2 \end{bmatrix} \quad (C36)$$

In addition, by substituting Equations (C34) and (C35) into Equation (C32) and replacing the second angular acceleration Dω2 with a virtual angular acceleration Dωz, Equation (C37) in the following can be obtained.

[Number C37]

$$Jz \cdot D\omega z = \tau z \quad (C37)$$

As is apparent by referring to Equation (C37), a general motion equation is established between the virtual angular acceleration Dωz and a virtual torque vector τz. Therefore, it is determined that, in the case where the power transmission mechanism 40 is in the connected state, if the torque vector τ_ref is calculated according to the calculation algorithms Equations (C23) to (C28) above, the link mechanism 1 can be suitably controlled by using the torque vector τ_ref.

In the following, a link mechanism control process of the present embodiment will be described with reference to FIG. 21. The control process controls the switching of the connected state/disconnected states of the power transmission mechanism 40 and controls the operation states of the first motor 11 and the second motor 21, and is executed by the controller 70 in the predetermined control cycle ΔT.

Figure 21:
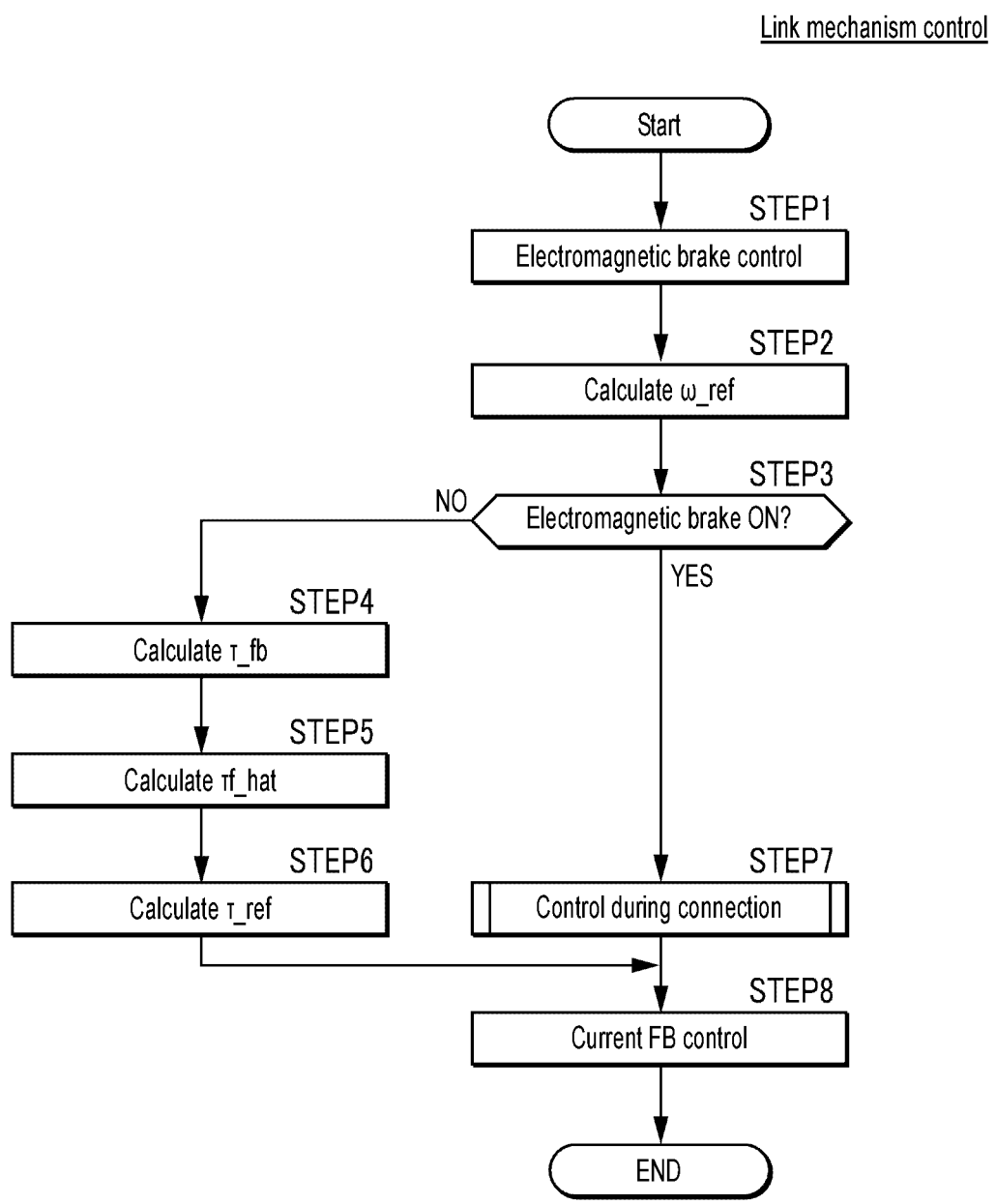
FIG. 21 is a flowchart illustrating a link mechanism control process.

As shown in the same figure, firstly, an electromagnetic brake control process is executed (FIG. 21/Step 1). In the electromagnetic brake control process, the electromagnetic brake 44 is turned on or off in response to parameters such as the first and second rotation angles θ1 and θ2 and the first and second currents I1 and I2.

Then, the target angular velocity vector ω_ref is calculated (FIG. 21/Step 2). Specifically, as described above, in order for the first rotation angle θ1 to become the target value θ1ref, the first target angular velocity ω1_ref is calculated according to the predetermined feedback control algorithm. In addition, in order for the second rotation angle θ2 to become the target value θ2ref, the second target angular velocity ω2_ref is calculated according to the predetermined feedback control algorithm. The target values θ1ref and θ2ref are calculated according to a calculation process not shown herein.

Then, whether the electromagnetic brake 44 is turned on or off is determined (FIG. 21/Step 3). At the time when the determination is NO (FIG. 21/Step 3 . . . NO), at the time when the electromagnetic brake 44 is OFF, i.e., at the time when the power transmission mechanism 40 is in the disconnected state, the feedback term vector τ_fb is calculated according to Equations (C4) to (C6) above.

Afterwards, the estimated error vector τf_hat is calculated according to Equation (C7) (FIG. 21/Step 5) above. Then, the target torque vector τ_ref is calculated according to Equation (C22) (FIG. 21/Step 6) above.

Then, a current FB control process is executed (FIG. 21/Step 8) and the present flow is ended. In the current FB control process, first and second target currents I1_ref and I2_ref are respectively calculated by dividing the two elements τ1_ref and τ2_ref of the target torque vector τ_ref by a torque constant. Then, feedback control is performed so that the first and second target currents I1 and I2 become the first and second target currents I1_ref and I2_ref.

Meanwhile, at the time when the determination is YES (FIG. 21/Step 3 . . . YES) and the electromagnetic brake 44 is ON, i.e., at the time when the power transmission mechanism 40 is in the connected state, a control process during connection is executed (FIG. 21/Step 7). Specifically, the control process during connection is executed as shown in FIG. 22.

Figure 22:
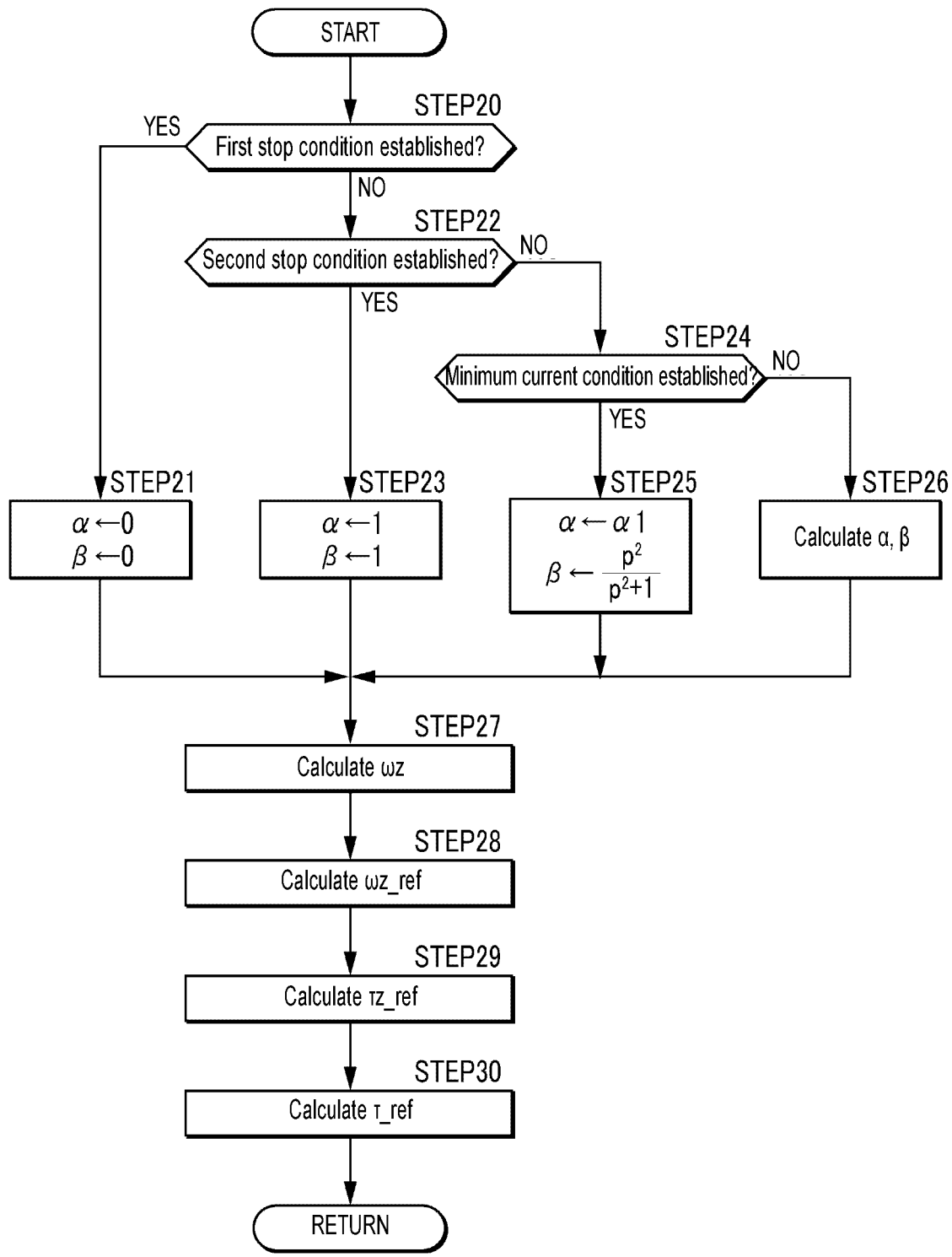
FIG. 22 is a flowchart illustrating a control process during connection.

As shown in the same figure, firstly, whether a first stop condition is established is determined (FIG. 22/Step 20). In this case, at the time when the first motor 11 is in an operation state that it should be stopped, it is determined that the first stop condition is established, otherwise it is determined that the first stop condition is not established . Specifically, for example, at the time when the first current I1 enters an overcurrent state, it is determined that the first stop condition is established.

At the time when the determination is YES (FIG. 22/Step 20 . . . YES) and the first stop condition is established, one of the mixing ratio α and the distribution ratio β is set as 0 (FIG. 22/Step 21).

Meanwhile, at the time when the determination is NO (FIG. 22/Step 20 . . . NO) and the first stop condition is not established, whether a second stop condition is established is determined (FIG. 22/Step 22). In this case, at the time when the second motor 21 is in an operation state that it should be stopped, it is determined that the second stop condition is established, otherwise it is determined that the second stop condition is not established. Specifically, for example, at the time when the second current I2 enters an overcurrent state, it is determined that the second stop condition is established.

At the time when the determination is YES (FIG. 22/Step 22 . . . YES) and the second stop condition is established, one of the mixing ratio α and the distribution ratio β is set as 1 (FIG. 22/Step 23).

Meanwhile, at the time when the determination is NO (FIG. 22/Step 22 . . . NO) and the second stop condition is not established, whether a minimum current condition is established is determined (FIG. 22/Step 24). In this case, at the time when the first and second motors 11 and 21 can operate in a state with minimally consumed currents, it is determined that the minimum current condition is established, otherwise it is determined that the minimum current condition is not established.

At the time when the determination is YES (FIG. 22/Step 24 . . . YES) and the minimum current condition is established, the mixing ratio α is set as a predetermined value α1, and the distribution ratio β is set as a value p2/(p2+1) (FIG. 22/Step 25). The reason why the distribution ratio β is set as the value p2/(p2+1) is that, at the time when β=p2/(p2+1), the sum of squares of the two target torque τ1_ref and τ2_ref, i.e., (τ1_ref2+τ2_ref2), becomes minimal. That is, the consumed currents of the first and second motors 11 and 21 become minimal.

Meanwhile, at the time when the determination is NO (FIG. 22/Step 24 . . . NO) and the minimum current condition is not established, the mixing ratio α and the distribution ratio β are calculated by searching a map not shown herein in response to the first current I1 and the second current I2 (FIG. 22/Step 26).

After the mixing ratio α and the distribution ratio β are calculated according to the above, the virtual angular velocity ωz is calculated according to Equation (C23) above (FIG. 22/Step 27). Then, the virtual target angular velocity ωz_ref is calculated according to Equation (C24) above (FIG. 22/Step 28).

Then, the virtual target torque τz_ref is calculated according to Equation (C25) above (FIG. 22/Step 29). Then, the target torque vector τ_ref is calculated according to Equations (C26) to (C28) above (FIG. 22/Step 30), and the flow is ended.

Returning to FIG. 12, after the control process during connection is executed as the above (FIG. 21/Step 7), the current FB control process is executed (FIG. 21/Step 8) and the flow is ended.

Figure 23:
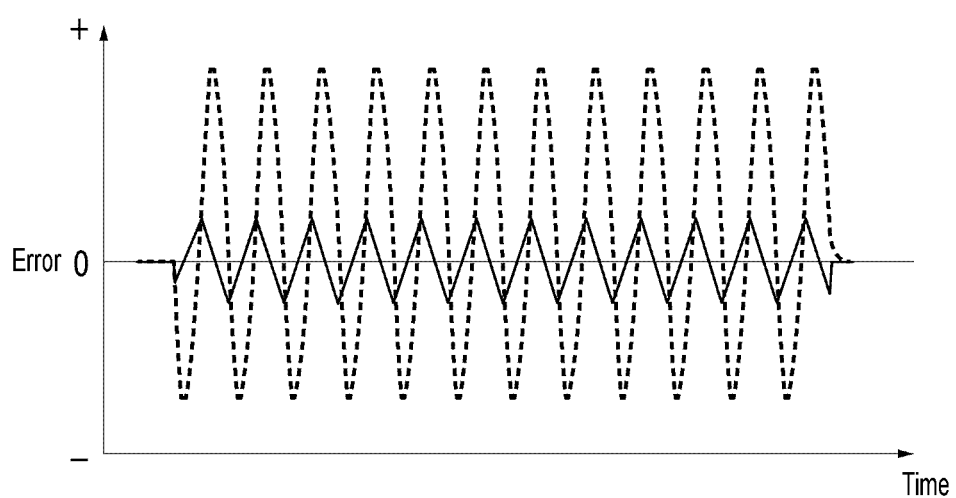
FIG. 23 is an explanatory diagram illustrating effects of an estimated error vector.

Then, the effect of the estimated error vector τf_hat in the controller 70 of the present embodiment is described with reference to FIG. 23. The same figure represents the transition of error when the first motor 11 is stopped and a predetermined sine wave current is supplied to the second motor 21, and, specifically, the error is equivalent to a deviation (θ1-0) of the first rotation angle θ1 from a value 0. This is because the deviation of the first rotation angle θ1 from the value 0 is regarded as a control error since the first rotation angle θ1 should be kept to the value 0 because the first motor 11 is stopped.

Also, in the same figure, the curve indicated by a solid line is the control result at the time when the target torque vector τ_ref is calculated by using the estimated error vector τf_hat of the present embodiment. Moreover, the curve indicated by a broken line is, as comparison, the comparing control result at the time when the target torque vector τ_ref is calculated without using the estimated error vector τf_hat, i.e., at the time when the target torque vector τ_ref is calculated by setting both the two elements τf1_hat and τf2_hat of the estimated error vector τf_hat as the value 0.

As is apparent from referring to the two curves, compared with the comparing control result, the control result of the present embodiment reduces the error to about ⅕, and owing to the effect of the estimated error vector τf_hat, the control accuracy is increased.

As the above, according to the control device 60 of the present embodiment, the electromagnetic brake 44 is controlled to be turned on/off, so that the power transmission mechanism 40 is switched between the connected state and the disconnected state. In the case where the power transmission mechanism 40 is in the disconnected state, the estimated error vector τf_hat is used to respectively control the first motor 11 and the second motor 21.

The arithmetic expression (C7) of the estimated error vector τf_hat is derived based on a virtual model (Equation (C16)) defining the relationship among the first angular velocity ω1, the second angular velocity ω2, the actual torque τ1 of the first motor 11 and the actual torque τ2 of the second motor 21 in the link mechanism 1 in the case of the disconnected state between the first joint 10 and the second joint 20 under the condition assuming that the power transmission mechanism 40 is not present and an actual model (Equation (C10)) defining the relationship among the first angular velocity ω1, the second angular velocity ω2, the actual torque τ1 of the first motor 11 and the actual torque τ2 of the second motor 21 in the link mechanism 1 in the case of the disconnected state between the first joint 10 and the second joint 20 under the actual condition that the power transmission mechanism 40 is present.

Therefore, the first motor 11 and the second motor 21 can be respectively controlled while the modeling error generated due to the actual presence of the power transmission mechanism 40, i.e., the estimated error vector τf_hat, under the condition of the disconnected state between the first joint 10 and the second joint 20 can be properly compensated. Accordingly, the control accuracy can be increased.

In addition, in the case where the power transmission mechanism 40 is in the connected state, the virtual angular velocity ωz, which is the rotation velocity of a virtual joint when the first joint 10 and the second joint 20 are regarded as the virtual joint, is calculated according to Equation (C23) for calculation in which the first motor 11 and the second motor 21 are set as independent variables, and the virtual angular velocity ωz is used to control the first motor 11 and the second motor 21.

As described above, at the time when the power transmission mechanism 40 is in the connected state, since the rotating shaft 11a of the first motor 11 and the rotating shaft 21a of the second motor 21 rotate so that ω1=p·ω2 is established, the first joint 10 and the second joint 20 can be regarded as one virtual joint. Therefore, the virtual angular velocity ωz, which is the angular velocity of the virtual joint, can be calculated according to Equation (C23) for calculation in which the first motor 11 and the second motor 21 are set as two independent variables. In addition, since the first motor 11 and the second motor 21 can be controlled by using the virtual angular velocity ωz, the calculation during control can be simplified.

In addition, in Equation (C23) for calculating the virtual angular velocity ωz, the multiplication coefficient of the first angular velocity ω1 is set as the product of the mixing ratio α and the proportional coefficient p, and the multiplication coefficient of the second angular velocity ω2 is set as 1−α. Therefore, the virtual angular velocity ωz can be calculated while the weights of the first motor 11 and the second motor 21 can be changed by changing the mixing ratio α. In addition, since the multiplication coefficient of the first angular velocity ω1 is set as the product of the mixing ratio α and the proportional coefficient p, the virtual angular velocity ωz can be calculated while the proportional relationship of the first motor 11 and the second motor 21 can be properly reflected.

Moreover, the virtual target torque τz_ref is calculated according to the predetermined feedback control algorithm to set the virtual angular velocity ωz as the virtual target angular velocity ωz_ref, and the target torques τ1_ref and τ2_ref to the first motor 11 and the second motor 21 are calculated by multiplying the target torque vector τ_ref by a value β/p and a value 1−β, respectively.

Therefore, the target torques τ1_ref and τ2_ref include a feedback control component for changing the virtual angular velocity ωz to the virtual target angular velocity ωz_ref. Then, the first motor 11 and the second motor 21 are controlled so that the actual torques of the first motor 11 and the second motor 21 become the target torques τ1_ref and τ2_ref. Therefore, the first motor 11 and the second motor 21 can be controlled while a control input component for changing the virtual angular velocity ωz to the virtual target angular velocity ωz_ref can be distributed.

In addition, since the two target torques τ1_ref and τ2_ref are calculated by multiplying the virtual target torque τz_ref by the values β/p and 1−β, respectively, the distribution ratio of the control input component to the two target torques τ1_ref and τ2_ref can be changed while the proportional relationship of the first motor 11 and the second motor 21 by changing the value of the distribution ratio β can be properly reflected.

As described above, in the case of the present embodiment, the first joint angular velocity ω1_j is equivalent to the value to which the first angular velocity ω1 is decelerated at the predetermined deceleration ratio. Therefore, in Equation (C2) described above, etc., the control process of FIGS. 21 to 22 may also be executed by using expressions in which the first motor 11 and the second motor 21 are respectively replaced by the first joint angular velocity ω1_j and the second joint angular velocity ω2_j.

While the embodiments are examples in which, as the first joint and the second joint, the first joint 10 and the second joint 20 rotating about the rotating shafts are used, a linear joint may also be used as at least one of the first joint and the second joint.

For example, in the case where one of the first joint and the second joint is a linear joint and the other of the first joint and the second joint is a joint rotating about the rotating shaft, when the power transmission mechanism is in the connected state and the power of the first joint and the power of the second joint are transmitted via the power transmission mechanism, through the configuration of the power transmission mechanism, the velocity of one of the first joint and the second joint is converted into the same dimension of the velocity of the other. That is, the proportional coefficient between the first joint and the second joint is determined by the configuration of the power transmission mechanism. The above configuration is equivalent to that, in the case where the power transmission mechanism is in the connected state, the first joint and the second joint operate so that the velocity of the first joint and the velocity of the second joint are is proportional to each other.

Moreover, while the embodiments are examples in which the angular velocities ω1 and ω2 are used as the velocities of the first joint and the second joint, in place thereof, rotation velocities whose representation unit is rpm or rps may also be used. Also, in the case of using a linear joint as described above, the movement velocity may be used.

In addition, as the equation for calculating the virtual angular velocity ωz, in place of Equation (C23) of the embodiment, any of Equations (C38) to (C40) below may also be used. In such case, as the equation for calculating the virtual target angular velocity ωz_ref, it suffices as long as the virtual angular velocity ωz is replaced by the virtual target angular velocity ωz_ref in any of the Equations (C38) to (C40) used to calculate the virtual angular velocity ωz.

[Number C38]

$$\omega z(k) = \alpha(k) \cdot \omega 1(k) + p \cdot \{1 - \alpha(k)\} \cdot \omega 2(k) \qquad (C38)$$

[Number C39]

$$\omega z(k) = \{1 - \alpha(k)\} \cdot \omega 1(k) + p \cdot \alpha(k) \cdot \omega 2(k) \qquad (C39)$$

[Number C40]

$$\omega z(k) = \left\{\frac{1 - \alpha(k)}{p}\right\} \cdot \omega 1(k) + \alpha(k) \cdot \omega 2(k) \qquad (C40)$$

Moreover, in Equations (C26) and (C27) for calculating the target torques $\tau 1\_ref$ and $\tau 2\_ref$, the value $\beta$ and the value $1-\beta$ may be interchanged. Moreover, the value $\beta/p$ of Equation (C26) for calculation may be replaced by the value $\beta$, and the value $1-\beta$ of Equation (C27) for calculation may be replaced by the value $(1-\beta)/p$. Additionally, the value $\beta/p$ of Equation (C26) for calculation may be replaced by the value $1-\beta$, and the value $1-\beta$ of Equation (C27) for calculation may be replaced by the value $\beta/p$.

Besides, the embodiment is an example using, as a power transmission mechanism, the power transmission mechanism 40 in which the four pulleys 41, 43*f*, 43*g*, and 46, the two belts 42 and 45, the planetary gear mechanism 43, and the electromagnetic brake 44 are assembled, but the power transmission mechanism of the invention is not limited thereto, and may also be any configuration switchable between the connected state in which the first joint and the second joint are connected and a disconnected state where the connection is removed. For example, as the power transmission mechanism, a gear mechanism may be used, and a mechanism combining a sprocket and a chain may also be used.

In addition, while the embodiment is an example using, as the first actuator, the first motor 11 that is a brushless DC motor, the first actuator of the invention is not limited thereto, and may also be one that drives the first link. For example, as the first actuator, an AC motor may be used, a linear actuator such as a linear motor or a hydraulic actuator may be used, a combination of a linear actuator and a gear mechanism may be used, a spring, etc., may also be used. In addition, as the first actuator, a hydraulic motor, a pneumatic motor, or a fluid pressure motor may be used.

In addition, while the embodiment is an example using, as the second actuator, the second motor 21 that is a brushless DC motor, the second actuator of the invention is not limited thereto, and may also be one that drives the second link. For example, as the second actuator, an AC motor may be used, a linear actuator such as a linear motor or a hydraulic actuator may be used, a combination of a linear actuator and a gear mechanism may be used, a spring, etc., may also be used. In addition, as the second actuator, a hydraulic motor, a pneumatic motor, or a fluid pressure motor may be used.

Besides, while the embodiment is an example using the electromagnetic brake 44, an electric actuator or a hydraulically driven actuator may be used in place of the electromagnetic brake 44.

In addition, the embodiment is an example in which the power transmission mechanism 40 is configured so that, at the time when the power transmission mechanism 40 is in the connected state, the torque of the first motor 11 and the torque of the second motor 21 can be transmitted between the first joint 10 and the second joint 20 in both directions. However, it may also be configured that, at the time when the power transmission mechanism 40 is in the connected state, the power transmission mechanism 40 is in the first state in which only the torque of the first motor 11 can be transmitted from the first joint 10 to the second joint 20. In addition, it may also be configured that, at the time when the power transmission mechanism 40 is in the connected state, the power transmission mechanism 40 is configured to be in the second state in which only the torque of the second motor 21 can be transmitted from the second joint 20 to the first joint 10.

An aspect of the invention provides a link mechanism 1, and the link mechanism 1 includes: a first joint 10; a first link 30, connected with the first joint 10; a first actuator (first motor 11), driving the first link 30; a second joint 20; a second link 50, connected with the second joint 20; a second actuator (second motor 21), driving the second link 50; and a power transmission mechanism 40, configured as capable of switching between a connected state with connection between the first joint 10 and the second joint 20, so that at least one state of a first state capable of transmitting power resulting from the first actuator (first motor 11) from the first joint 10 to the second joint 20 and a second state capable of transmitting power resulting from the second actuator (second motor 21) from the second joint 20 to the first joint 10 is established, and a disconnected state in which the connection is removed. In a case where the power transmission mechanism 40 is in the connected state, the first joint 10 and the second joint 20 operate so that a velocity (angular velocity $\omega 1$) of the first joint 10 and a velocity (angular velocity $\omega 2$) of the second joint 20 are proportional to each other.

According to the link mechanism, the first link is driven by the first actuator, and the second link is driven by the second actuator. In addition, the power transmission mechanism is configured as capable of switching between the connected state with connection between the first joint and the second joint, so that at least one state of the first state capable of transmitting power resulting from the first actuator from the first joint to the second joint and the second state capable of transmitting power resulting from the second actuator from the second joint to the first joint is established, and the disconnected state in which the connection is removed. In the case where the power transmission mechanism is in the connected state, the first joint and the second joint operate so that the velocity of the first joint and the velocity of the second joint are proportional to each other.

Therefore, in the case where an external force acts on one or both of the first link and the second link, the external force can be supported by at least one power of the power of the first actuator, the power of the second actuator, the power transmitted from the first joint to the second joint, and the power transmitted from the second joint to the first joint. Accordingly, compared with the case where the external force acting on one or both of the first link and the second link by the power of the first and second actuators, the same power is ensured, while the power of the first and second actuators, i.e., the consumed energy, is reduced. Accordingly, the output per actuator, i.e., the consumed energy per actuator, can be reduced, and the actuator can be smaller and lighter. Accordingly, the running cost can be reduced.

According to an embodiment of the invention, in the link mechanism 1, the first actuator (first motor 11) drives the first link 30 to rotate about a rotating shaft of the first joint 10, the second actuator (second motor 21) drives the second link 50 to rotate about a rotating shaft of the second joint 20, and in the case where the power transmission mechanism 40 is in the connected state, the first joint 10 and the second joint 20 rotate so that a rotation velocity (angular velocity $\omega 1$) of the first joint 10 and a rotation velocity (angular velocity $\omega 1$) of the second joint 20 are proportional to each other.

According to the link mechanism, the first link is driven to rotate by the first actuator, and the second link is driven to rotate by the second actuator. In addition, in the case where the power transmission mechanism is in the connected state, the first joint and the second joint rotate so that the rotation velocity of the first joint and the rotation velocity of the second joint are proportional to each other. Therefore, as described above, the output per actuator, i.e., the consumed energy per actuator, can be reduced, and the actuator can be smaller and lighter. Accordingly, the running cost can be reduced.

According to an embodiment of the invention, in the link mechanism 1, the first joint 10 has a first decelerator 12 which decelerates and transmits power of the first actuator (first motor 11) to the first link 30 and a first element (rotating shaft 11a) which inputs the power of the first actuator (first motor 11) to the first decelerator 12, the second joint 20 has a second decelerator 22 which decelerates and transmits power of the second actuator (second motor 21) to the second link 50 and a second element (rotating shaft 21a) which inputs the power of the second actuator (second motor 21) to the second decelerator 22. In the case where the power transmission mechanism is in the connected state, the first element (rotating shaft 11a) and the second element (rotating shaft 21a) are connected by the power transmission mechanism 40.

According to the link mechanism, in the case where the power transmission mechanism is in the connected state, the first element inputting the power of the first actuator to the first decelerator and the second element inputting the power of the second actuator to the second decelerator are connected. Accordingly, since the first joint and the second joint can be connected to be able to transmit power by connecting the elements on the input side of the two decelerators, compared with the case where the elements on the output side of the two decelerators are connected, the torque capacity in the power transmission mechanism can be reduced, and the size and the weight of the power transmission mechanism and the cost can be reduced accordingly.

According to an embodiment of the invention, in the link mechanism 1, the power transmission 40 has a planetary gear mechanism 43 in which two rotation elements of a sun gear 43a, a planetary carrier 43d, and a ring gear 43e are respectively connected with the first joint 10 and the second joint 20; and a rotation stop mechanism (electromagnetic brake 44) capable of maintaining one rotation element other than the two rotation elements of the planetary gear mechanism 43 in a non-rotatable state.

According to the link mechanism, it is configured that two rotation elements of the sun gear, the planetary carrier, and the ring gear in the planetary gear mechanism are respectively connected with the first joint and the second joint, and one rotation element other than the two rotation elements of the planetary gear mechanism is maintained in the non-rotatable state by the rotation stop mechanism. Therefore, for example, in the case where the planetary gear mechanism is of a single planetary type, at the time when the sun gear or the ring gear is maintained as non-rotatable, the first joint and the second joint are connected in a state of rotating in the same direction, and at the time when the planetary carrier is maintained as non-rotatable, the first joint and the second joint are connected in a state of rotating in directions opposite to each other. According to the above, by choosing the rotation elements respectively connected with the first link and the second link, the rotation directions of the first joint and the second joint can be easily set as the same direction or opposite directions.

An aspect of the invention provides a control device 60 of the link mechanism 1, and the control device 60 includes: a mechanism control part (controller 70, Step 1), controlling the power transmission mechanism 40, so as to switch between the connected state and the disconnected state between the first joint 10 and the second joint 20; a modeling error estimation part (controller 70, disturbance observer 82, Step 5), estimating a modeling error (estimated error vector τf_hat) based on a virtual model (Equation (C16) defining a dynamic characteristic of the link mechanism 1 in a case of the disconnected state between the first joint 10 and the second joint 30 under a condition assuming that the power transmission mechanism 40 is not present and an actual model (Equations (C10) to (C15)) defining the dynamic characteristic of the link mechanism 1 in the case of the disconnected state between the first joint 10 and the second joint 20 under an actual condition that the power transmission mechanism 40 is present; and an actuator control part (controller 70, Steps 6 and 8), in the case of the disconnected state between the first joint 10 and the second joint 20, controlling the first actuator and the second actuator by using the modeling error .

According to the control device of the link mechanism, the power transmission mechanism is controlled so as to switch between the connected state and the disconnected state between the first joint and the second joint, and in the case of the disconnected state between the first joint and the second joint, the first actuator and the second actuator are controlled by using the modeling error. The modeling error is estimated based on the virtual model defining the dynamic characteristic of the link mechanism in the case of the disconnected state between the first joint and the second joint under the condition assuming that the power transmission mechanism is not present and the actual model defining the dynamic characteristic of the link mechanism in the case of the disconnected state between the first joint and the second joint under an actual condition that the power transmission mechanism is present.

Therefore, the first actuator and the second actuator can be respectively controlled while the modeling error resulting from the actual presence of the power transmission mechanism under the condition of the disconnected state between the first joint and the second joint can be properly compensated. Accordingly, the control accuracy can be increased.

According to an embodiment of the invention, the control device 60 further includes a virtual velocity calculation part (controller 70, virtual angular velocity calculation part 92, Step 27) which, in a case of the connected state between the first joint 10 and the second joint 20, calculates a virtual velocity (virtual angular velocity $\omega z$) that is a velocity of a virtual joint at a time when the first joint 10 and the second joint 20 are regarded as the virtual joint according to a two-variable linear expression (Equation (C23)) with the first velocity and the second velocity as two independent variables, and the actuator control part controls (Steps 7 and 8), in the case of the connected state between the first joint 10 and the second joint 20, the first actuator and the second actuator by using the virtual velocity.

According to the control device of the link mechanism, in the case of the connected state between the first joint and the second joint, the virtual velocity that is the velocity of the virtual joint at the time when the first joint and the second joint are regarded as the virtual joint is calculated according to the two-variable linear expression with the first velocity and the second velocity as two independent variables, and the first actuator and the second actuator are controlled by using the virtual velocity.

In this case, at the time of the connected state between the first joint and the second joint, since the first joint and the second joint operate so that the velocities thereof are proportional to each other, the first joint and the second joint can be regarded as one virtual joint. Therefore, the virtual velocity, which is the velocity of the virtual joint, can be calculated according to the two-variable linear expression with the first velocity and the second velocity as two independent variables. In addition, since the first actuator and the second actuator can be controlled by using the virtual velocity, the two actuators can be controlled while the output of the first actuator and the output of the second actuator can be prevented from interfering with each other.

An aspect of the invention provides a control device 60 of the link mechanism 1, and the control device 60 includes: a mechanism control part (controller 70, Step 1), controlling the power transmission mechanism 40, so as to switch between the connected state and the disconnected state between the first joint 10 and the second joint 20; the control device 60 further includes a virtual velocity calculation part (controller 70, virtual angular velocity calculation part 92, Step 27) which, in a case of the connected state between the first joint 10 and the second joint 20, calculates a virtual velocity (virtual angular velocity ωz) that is a velocity of a virtual joint at a time when the first joint 10 and the second joint 20 are regarded as the virtual joint according to a two-variable linear expression (Equation (C23)) with the first velocity and the second velocity as two independent variables; and the actuator control part (controller 70, Steps 7 and 8) controls, in the case of the connected state between the first joint 10 and the second joint 20, the first actuator and the second actuator by using the virtual velocity.

According to the control device of the link mechanism, the power transmission mechanism is controlled so as to switch between the connected state and the disconnected state between the first joint and the second joint. In addition, in the case of the connected state between the first joint and the second joint, the virtual velocity that is the velocity of the virtual joint at the time when the first joint and the second joint are regarded as the virtual joint is calculated according to the two-variable linear expression with the first velocity and the second velocity as two independent variables. Then, since the first actuator and the second actuator are controlled by using the virtual velocity, as described above, the two actuators can be controlled while the output of the first actuator and the output of the second actuator can be prevented from interfering with each other.

According to an embodiment of the invention, in the control device 60 of the link mechanism 1, in the two-variable linear expression, a first multiplication coefficient (α/p), which is a multiplication coefficient of the first velocity, includes one of a predetermined value α, wherein 0≤α≤1, and a value 1−α, and a second multiplication coefficient (1−α), which is a multiplication coefficient of the second velocity, includes the other of the predetermined value α and the value 1−α, and it is configured that one of the first multiplication coefficient and the second multiplication coefficient includes a proportional parameter (proportional coefficient p) representing a proportional relationship between the first velocity and the second velocity.

According to the control device of the link mechanism, the first multiplication coefficient, which is the multiplication coefficient of the first velocity, includes one of the predetermined value α, wherein 0≤α≤1, and the value 1−α, and the second multiplication coefficient, which is the multiplication coefficient of the second velocity, includes the other of the predetermined value α and the value 1−α. Therefore, the virtual velocity can be calculated by changing the value of the predetermined value awhile the weights of the first velocity and the second velocity can be changed. In addition, since it is configured that one of the first multiplication coefficient and the second multiplication coefficient includes the proportional parameter representing the proportional relationship between the first velocity and the second velocity, the virtual velocity can be calculated while the proportional relationship of the first velocity and the second velocity can be properly reflected.

According to an embodiment of the invention, in the control device 60 of the link mechanism 1, the control device 60 further includes a virtual target velocity calculation part (controller 70, virtual angular velocity calculation part 93, Step 28), which calculates a virtual target velocity (virtual target angular velocity ωz_ref) serving as a target of the virtual velocity (virtual angular velocity ωz), the actuator control part calculates a virtual target output (virtual target torque τz_ref) according to a predetermined control algorithm (Equation (C25)) so that the virtual velocity becomes the virtual target velocity, a first multiplication coefficient (β/p) includes one of a predetermined value β, wherein 0≤β≤1, and a value 1−β and a second multiplication coefficient includes the other of the predetermined value β and the value 1−β, it is configured that one of the first multiplication coefficient and the second multiplication coefficient includes a proportional parameter (proportional coefficient p) representing a proportional relationship between the first velocity and the second velocity, and a target output (first target torque τ1_ref) of the first actuator and a target output (second target torque τ2_ref) of the second actuator are respectively calculated by multiplying the virtual target output by the first multiplication coefficient and the second multiplication coefficient, and the first actuator and the second actuator are controlled so that an output (first actual torque τ1) of the first actuator and an output (second actual torque τ2) of the second actuator respectively become the target output of the first actuator and the target output of the second actuator (Steps 7 and 8).

According to the control device of the link mechanism, since the virtual target output is calculated according to the predetermined control algorithm so that the virtual velocity becomes the virtual target velocity, the virtual target output is calculated so as to include a feedforward control term or a feedback control term. In addition, since the target output of the first actuator and the target output of the second actuator are calculated by multiplying the virtual target output by the first multiplication coefficient and the second multiplication coefficient, respectively, the target outputs include a component of the feedforward control term or the feedback control term for changing the virtual velocity to the virtual target velocity. Then, the first actuator and the second actuator are controlled so that an output of the first actuator and an output of the second actuator respectively become the target output of the first actuator and the target output of the second actuator. Therefore, the first actuator and the second actuator can be controlled while a control input component for changing the virtual velocity to the virtual target velocity can be distributed.

In addition, the first multiplication coefficient includes one of the predetermined value β, wherein 0≤β≤1, and the value 1−β, and the second multiplication coefficient includes the other of the predetermined value β and the value 1−β, and it is configured that one of the first multiplication coefficient and the second multiplication coefficient includes the proportional parameter representing the proportional relationship between the first velocity and the second velocity. By changing the value the predetermined value β, the distribution ratio of the control input component to the two target outputs can be changed while the proportional relationship of the first velocity and the second velocity can be properly reflected.

An aspect of the invention provides a control method of the link mechanism 1, and the control method of the link mechanism 1 includes: controlling the power transmission mechanism 40, so as to switch between the connected state and the disconnected state between the first joint 10 and the second joint 10 (Step 1); estimating a modeling error (estimated error vector τf_hat) based on a virtual model (Equation (C16) defining a dynamic characteristic of the link mechanism 1 in a case of the disconnected state between the first joint 10 and the second joint 20 under a condition assuming that the power transmission mechanism 40 is not present and an actual model (Equations (C10) to (C15)) defining the dynamic characteristic of the link mechanism 1 in the case of the disconnected state between the first joint 10 and the second joint 20 under an actual condition that the power transmission mechanism 40 is present; and in the case of the disconnected state between the first joint 10 and the second joint 20, controlling (Steps 6 and 7) the first actuator and the second actuator by using the modeling error.

According to an embodiment of the invention, in the control method of the link mechanism 1, in a case of the connected state between the first joint 10 and the second joint 20, a virtual velocity (virtual angular velocity ωz) that is a velocity of a virtual joint at a time when the first joint 10 and the second joint 10 are regarded as the virtual joint is calculated (Step 27) according to a two-variable linear expression (Equation (C23)) with the first velocity and the second velocity as two independent variables, and in the case of the connected state between the first joint 10 and the second joint 20, the first actuator and the second actuator are controlled (Steps 7 and 8) by using the virtual velocity.

An aspect of the invention provides a control method of the link mechanism 1, and the control method of the link mechanism 1 includes: controlling the power transmission mechanism 40, so as to switch between the connected state and the disconnected state between the first joint 10 and the second joint 10 (Step 1); in a case of the connected state between the first joint 10 and the second joint 20, a virtual velocity (virtual angular velocity ωz) that is a velocity of a virtual joint at a time when the first joint 10 and the second joint 10 are regarded as the virtual joint is calculated (Step 27) according to a two-variable linear expression (Equation (C23)) with the first velocity and the second velocity as two independent variables, and in the case of the connected state between the first joint 10 and the second joint 20, the first actuator and the second actuator are controlled by using the virtual velocity.

According to an embodiment of the invention, in the control method of the link mechanism 1, in the two-variable linear expression, a first multiplication coefficient ($\alpha/p$), which is a multiplication coefficient of the first velocity, includes one of a predetermined value $\alpha$, wherein $0 \leq \alpha \leq 1$, and a value $1-\alpha$, and a second multiplication coefficient $(1-\alpha)$, which is a multiplication coefficient of the second velocity, includes the other of the predetermined value $\alpha$ and the value $1-\alpha$, and it is configured that one of the first multiplication coefficient and the second multiplication coefficient includes a proportional parameter (proportional coefficient p) representing a proportional relationship between the first velocity and the second velocity.

According to an embodiment of the invention, in the control method of the link mechanism 1, a virtual target velocity (virtual target angular velocity ωz_ref) serving as a target of the virtual velocity (virtual angular velocity ωz) is calculated (Step 28), a virtual target output (virtual target torque τz_ref) is calculated according to a predetermined control algorithm (Equation (C25)), so that the virtual velocity becomes the virtual target velocity, a first multiplication coefficient ($\beta/p$) includes one of a predetermined value $\beta$, wherein $0 \leq \beta \leq 1$, and a value $1-\beta$, and a second multiplication coefficient includes the other of the predetermined value $\beta$ and the value $1-\beta$, and it is configured that one of the first multiplication coefficient and the second multiplication coefficient includes a proportional parameter (proportional coefficient p) representing a proportional relationship between the first velocity and the second velocity, a target output (first target torque $\tau 1\_ref$) of the first actuator and a target output (second target torque $\tau 2\_ref$) of the second actuator are respectively calculated by multiplying the virtual target output by the first multiplication coefficient and the second multiplication coefficient, and the first actuator and the second actuator are controlled (Steps 7 and 8) so that an output of the first actuator and an output of the second actuator respectively become the target output of the first actuator and the target output of the second actuator.

What is claimed is:

1. A link mechanism, comprising:
a first joint;
a first link, connected with the first joint;
a first actuator, driving the first link to rotate about a rotating shaft of he first joint;
a second joint;
a second link, connected with the second joint;
a second actuator, driving the second link to rotate about a rotating shaft of the second joint; and
a power transmission mechanism, comprising:
a first pulley, disposed at the first actuator;
a gear mechanism, having a carrier side pulley disposed between the first joint and the second joint;
a first belt, wound between the first pulley and the carrier side pulley;
a second pulley, disposed at the second actuator;
a second belt, wound between the second pulley and the carrier side pulley; and
a brake, coupled to the gear mechanism,
wherein the brake is configured to be switched between an ON operation state and an OFF operation state,
at the time when the brake is in the ON operation state, a torque-connected state in which a torque is transmitted between the first joint and the second joint is established between the first joint and the second joint, and
at the time when the brake is in the OFF operation state, a torque-disconnected state in which a torque is not transmitted between the first joint and the second joint is established between the first joint and the second joint,
wherein in a case where the brake is in the ON operation state, the first joint and the second joint operate so that an angular velocity of the first joint and an angular velocity of the second joint are proportional to each other.

2. The link mechanism as claimed in claim 1, wherein:
the first joint has a first decelerator which decelerates and transmits power of the first actuator to the first link and a first element which inputs the power of the first actuator to the first decelerator,
the second joint has a second decelerator which decelerates and transmits power of the second actuator to the second link and a second element which inputs the power of the second actuator to the second decelerator, and
in the case where the brake is in the ON operation state, the first element and the second element are connected via a torque by the power transmission mechanism.

3. The link mechanism as claimed in claim 1, wherein:
the gear mechanism is a planetary gear mechanism in which two rotation elements of a sun gear, a planetary carrier, and a ring gear are respectively connected with the first joint and the second joint; and the brake maintains one rotation element other than the two rotation elements of the planetary gear mechanism in a non-rotatable state.

4. A control device of the link mechanism of claim 1, wherein the control device comprises:
a controller, configured to perform:
controlling the power transmission mechanism, so as to switch between the torque-connected state and the torque-disconnected state between the first joint and the second joint;
estimating a modeling error based on a virtual model defining a dynamic characteristic of the link mechanism in a case of the torque-disconnected state between the first joint and the second joint under a condition assuming that the power transmission mechanism is not present and an actual model defining the dynamic characteristic of the link mechanism in the case of the torque-disconnected state between the first joint and the second joint under an actual condition that the power transmission mechanism is present; and
in the case of the torque-disconnected state between the first joint and the second joint, controlling the first actuator and the second actuator by using the modeling error.

5. The control device of the link mechanism as claimed in claim 4, wherein:
in a case of the torque-connected state between the first joint and the second joint, the controller is configured to calculate a virtual angular velocity that is an angular velocity of a virtual joint at a time when the first joint and the second joint are regarded as the virtual joint according to a two-variable linear expression with a first angular velocity and a second angular velocity as two independent variables, and
the controller is configured to control, in the case of the torque-connected state between the first joint and the second joint, the first actuator and the second actuator by using the virtual angular velocity.

6. The control device of the link mechanism as claimed in claim 5, wherein:
in the two-variable linear expression, a first multiplication coefficient, which is a multiplication coefficient of the first angular velocity, comprises one of a predetermined value α, wherein 0≤α≤1, and a value 1−α, and a second multiplication coefficient, which is a multiplication coefficient of the second angular velocity, comprises the other of the predetermined value aand the value 1−a, and wherein one of the first multiplication coefficient and the second multiplication coefficient comprises a proportional parameter representing a proportional relationship between the first angular velocity and the angular second velocity.

7. The control device of the link mechanism as claimed in claim 5, wherein:
the controller is configured to calculate a virtual target angular velocity serving as a target of the virtual angular velocity,
calculate a virtual target output according to a predetermined control algorithm so that the virtual angular velocity becomes the virtual target angular velocity, a first multiplication coefficient comprises one of a predetermined value β, wherein 0≤β≤1, and a value 1−β and a second multiplication coefficient comprises the other of the predetermined value β and the value 1−β, wherein one of the first multiplication coefficient and the second multiplication coefficient comprises a proportional parameter representing a proportional relationship between the first angular velocity and the angular second velocity, a target output of the first actuator and a target output of the second actuator are respectively calculated by multiplying the virtual target output by the first multiplication coefficient and the second multiplication coefficient, and the first actuator and the second actuator are controlled so that an output of the first actuator and an output of the second actuator respectively become the target output of the first actuator and the target output of the second actuator.

8. A control device of the link mechanism of claim 1, wherein the control device comprises:
a controller configured to perform:
controlling the power transmission mechanism, so as to switch between the torque-connected state and the torque-disconnected state between the first joint and the second joint;
in a case of the torque-connected state between the first joint and the second joint, calculates a virtual angular velocity that is an angular velocity of a virtual joint at a time when the first joint and the second joint are regarded as the virtual joint according to a two-variable linear expression with a first angular velocity and a second angular velocity as two independent variables, and
in the case of the torque-connected state between the first joint and the second joint, controlling the first actuator and the second actuator by using the virtual angular velocity.

9. A control method of the link mechanism of claim 1, wherein the control method comprises:
controlling the power transmission mechanism, so as to switch between the torque-connected state and the torque-disconnected state between the first joint and the second joint;
estimating a modeling error based on a virtual model defining a dynamic characteristic of the link mechanism in a case of the torque-disconnected state between the first joint and the second joint under a condition assuming that the power transmission mechanism is not present and an actual model defining the dynamic characteristic of the link mechanism in the case of the torque-disconnected state between the first joint and the second joint under an actual condition that the power transmission mechanism is present; and
in the case of the torque-disconnected state between the first joint and the second joint, controlling the first actuator and the second actuator by using the modeling error.

10. The control method of the link mechanism as claimed in claim 9, wherein:
in a case of the torque-connected state between the first joint and the second joint, a virtual angular velocity that is an angular velocity of a virtual joint at a time when the first joint and the second joint are regarded as the virtual joint is calculated according to a two-variable linear expression with a first angular velocity and a second angular velocity as two independent variables, and
in the case of the torque-connected state between the first joint and the second joint, the first actuator and the second actuator are controlled by using the virtual angular velocity.

11. The control method of the link mechanism as claimed in claim 10, wherein:
in the two-variable linear expression, a first multiplication coefficient, which is a multiplication coefficient of the first angular velocity, comprises one of a predetermined value α, wherein 0≤α≤1, and a value 1−α, and a second multiplication coefficient, which is a multiplication coefficient of the second angular velocity, comprises the other of the predetermined value α and the value 1−α, and wherein one of the first multiplication coefficient and the second multiplication coefficient comprises a proportional parameter representing a proportional relationship between the first angular velocity and the second angular velocity.

12. The control method of the link mechanism as claimed in claim 10, wherein:
a virtual target angular velocity serving as a target of the virtual angular velocity is calculated,
a virtual target output is calculated according to a predetermined control algorithm, so that the virtual angular velocity becomes the virtual target angular velocity,
a first multiplication coefficient comprises one of a predetermined value β, wherein 0≤β≤1, and a value 1−β, and a second multiplication coefficient comprises the other of the predetermined value β and the value 1−β, and wherein one of the first multiplication coefficient and the second multiplication coefficient comprises a proportional parameter representing a proportional relationship between the first angular velocity and the second angular velocity,
a target output of the first actuator and a target output of the second actuator are respectively calculated by multiplying the virtual target output by the first multiplication coefficient and the second multiplication coefficient, and
the first actuator and the second actuator are controlled so that an output of the first actuator and an output of the second actuator respectively become the target output of the first actuator and the target output of the second actuator.

13. A control method of the link mechanism of claim 1, wherein the control method comprises:
controlling the power transmission mechanism, so as to switch between the torque-connected state and the torque-disconnected state between the first joint and the second joint;
in a case of the torque-connected state between the first joint and the second joint, a virtual angular velocity that is an angular velocity of a virtual joint at a time when the first joint and the second joint are regarded as the virtual joint is calculated according to a two-variable linear expression with a first angular velocity and a second angular velocity as two independent variables, and
in the case of the torque-connected state between the first joint and the second joint, the first actuator and the second actuator are controlled by using the virtual angular velocity.

* * * * *